US012591501B1

(12) United States Patent
McMahon

(10) Patent No.: US 12,591,501 B1
(45) Date of Patent: Mar. 31, 2026

(54) TESTING FUNCTIONALITY OF AND GENERATING ON-CHAIN PROGRAMS

(71) Applicant: Citibank, N.A., New York, NY (US)

(72) Inventor: Alex McMahon, Dublin (IE)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/066,002

(22) Filed: Feb. 27, 2025

(51) Int. Cl.
  *G06F 11/3604* (2025.01)
  *H04L 9/00* (2022.01)

(52) U.S. Cl.
  CPC ............ *G06F 11/3608* (2013.01); *H04L 9/50* (2022.05)

(58) Field of Classification Search
  CPC ............................... G06F 11/3608; H04L 9/50
  See application file for complete search history.

(56) References Cited

U.S. PATENT DOCUMENTS

| | | | | |
|---|---|---|---|---|
| 11,494,171 | B1 * | 11/2022 | Acharya | H04L 9/0861 |
| 2002/0194578 | A1 * | 12/2002 | Irie | G06F 8/36 |
| | | | | 717/122 |
| 2019/0243912 | A1 * | 8/2019 | Duraisamy Soundrapandian | G06F 8/30 |
| 2020/0117493 | A1 * | 4/2020 | Wang | H04L 9/0844 |
| 2020/0142693 | A1 | 5/2020 | Neugschwandtner et al. | |
| 2020/0210148 | A1 * | 7/2020 | Li | G06F 8/35 |
| 2020/0285633 | A1 | 9/2020 | Zhuo et al. | |
| 2020/0313904 | A1 * | 10/2020 | Ramgopal | H04L 9/3263 |
| 2020/0349054 | A1 | 11/2020 | Dai et al. | |

| | | | | |
|---|---|---|---|---|
| 2021/0158463 | A1 | 5/2021 | Madl et al. | |
| 2022/0318399 | A1 * | 10/2022 | Rodler | G06F 21/51 |
| 2023/0072988 | A1 * | 3/2023 | Mathews | G06F 8/30 |

(Continued)

FOREIGN PATENT DOCUMENTS

WO 2019101234 A2 5/2019

OTHER PUBLICATIONS

Mohammad Hamdaqa et al., "iContractML 2.0: A domain-specific language for modeling and deploying smart contracts onto multiple blockchain platforms," 2022 [retrieved May 27, 2025], Information and Software Technology, vol. 144, pp. 1-14, downloaded from <url>:https://www.sciencedirect.com. (Year: 2022).*

(Continued)

*Primary Examiner* — S. Sough
*Assistant Examiner* — Stephen D Berman
(74) *Attorney, Agent, or Firm* — Perkins Coie LLP

(57) ABSTRACT

Systems and methods for generating and testing on-chain programs are disclosed herein. A system for generating on-chain programs may receive a request to generate on-chain program code for an on-chain program and determine a model required for the program. The system may retrieve functions associated with the model and determine blockchain operations to be added to the program. The system may determine parameters for blockchain operations and generate on-chain program code. A system for testing on-chain programs may install an on-chain program onto a test blockchain and retrieve functions associated with a model generated for testing. The system may generate blockchain operations for testing and input each operation into a cryptography-based storage application. The system may cause execution of the operations and receive results. Based on determining that a number of failed results exceed a threshold, the system may generate a notification.

18 Claims, 13 Drawing Sheets

(56)                    References Cited

U.S. PATENT DOCUMENTS

| | | | | |
|---|---|---|---|---|
| 2023/0097203 A1* | 3/2023 | Little | | H04L 9/3213 |
| | | | | 713/193 |
| 2023/0252152 A1* | 8/2023 | Yerra | | G06F 21/57 |
| | | | | 726/26 |
| 2023/0269085 A1 | 8/2023 | Schreck et al. | | |
| 2023/0412639 A1 | 12/2023 | Xu et al. | | |
| 2024/0250820 A1 | 7/2024 | Osborn et al. | | |
| 2024/0330927 A1* | 10/2024 | Abdelrahman | ........ | G06N 3/045 |

OTHER PUBLICATIONS

T. Tateishi et al., "Automatic smart contract generation using controlled natural language and template," 2019 [retrieved May 24, 2025], IBM Journal of Research and Development, vol. 63, Issue: 2/3, pp. 1-12, downloaded from <url>:https://ieeexplore.ieee.org. (Year: 2019).*
Giordano, "Introducing Contracts Wizard: An Interactive Contract Generator," Apr. 5, 2021 [retrieved Aug. 19, 2025], pp. 1-4, downloaded from the Wayback Machine at <url>:https://web.archive.org/web/20210405212020/https://blog.openzeppelin.com/wizard. (Year: 2021).*
Pratap, "Upgradable Smart Contracts: What They Are and How To Deploy Your Own," Nov. 9, 2022, pp. 1-18, downloaded from the Wayback Machine at <url>:https://web.archive.org/web/20221129003405/https://blog.chain.link/upgradable-smart-contracts/#code_along. (Year: 2022).*
Issam Al-Azzoni et al., "Model-Driven Approach for Generating Smart Contracts for Access Control," 2023 [retrieved Nov. 30, 2025], Fifth International Conference on Blockchain Computing and Applications, pp. 112-115, downloaded from <url>:https://ieeexplore.ieee.org/abstract/document/10338863. (Year: 2023).*
Shaima Al Amri et al., "A Review of Upgradeable Smart Contract Patterns based on OpenZeppelin Technique", 2023 [retrieved [Nov. 30, 2025], pp. 1-8, downloaded from <url>:https://jbba.scholasticahq.com/article/73752.pdf. (Year: 2023).*
Kees Boogaard, "A Model-Driven Approach to Smart Contract Development," 2018 [retrieved Nov. 30, 2025], pp. 1-146, downloaded from <url>:https://studenttheses.uu.nl/handle/20.500.12932/29326. (Year: 2018).*
Office Action Non-Final issued in related U.S. Appl. No. 19/066,040 on May 7, 2025 (37 pages).
U.S. Appl. No. 19/066,040, filed Feb. 27, 2025, Alex McMahon, entitled, Testing Functionality of and Generating On-Chain Programs.
Office Action Final issued Sep. 24, 2025, in U.S. Appl. No. 19/066,040 (43 pages).

* cited by examiner

200

```
contract _mint {
    address public minter;
    mapping(address => uint) public balances;
    event Sent(address from, address to, uint amount);

constructor() {
        minter = msg.sender;
    } function mint(address receiver, uint amount) public {
        require(msg.sender == minter);
        balances[receiver] += amount;
    }
    ...
}
```

```
functions {
        test_no_ownership {
                invalid_Tx(a, U₁, U₂) :    (¬O(a) = U₁) ∧ (Control(a) = U₁)) =>
                                           (failure)
        }
        test_no_control {
                invalid_Tx(a, U₁, U₂) :    (O(a) = U₁) ∧ (¬Control(a) = U₁)) =>
                                           (failure)
        }
        ...

```
blockchain_operations {
        user = generate_user_no_ownership();
        result = execute(on_chain_program(user));
        flag = "passed" if (result.status == "failed") else "failed";
}
```

```
Request{
    request_id = "23redbkjwwe"
    blockchain_id = "blockchain_a"
    on_chain_program_id = "2k3jnredkns"
    type_of_request = "modify"
    functionality = "ownership_requirement"
    requirement = "UCC 12 standard"
    on_chain_program {
        contract_mint {
            address public minter;
            mapping(address => uint) public balances;
            event Sent(address from, address to, uint amount);
            ...
        }
    }
}
```

```
Interface ERC{
  function ownerOf(uint256 tokenId) returns (address);
  function safeTransfer(address from, address to, uint256
  tokenId) external;
  } contract SecureNFTtx {
  function transferNFT(address nftContract, address to, uint256
  tokenId) public {
    ERC nft = ERC(nftContract);

require(nft.ownerOf(tokenId) == msg.sender, "Caller is not the
    owner");

}
```

710

700

800

810

820

830

Definitions {
　Entities {U : users; A : asset; C : contract owner; Tx : transaction}
　...
}

Relationships {
　O(a) ∈ U　　　　//owner of asset a is element of users
　Control(a) ∈ U　//control of the asset belongs to a user
　...
}

Valid Tx {
　Tx(a, U₁, U₂) :　(O(a) = U₁) ∧ (Control(a) = U₁)) =>
　　　　　　　　　　(O(a) = U₂) ∧ (Control(a) = U₂))
　}
　...
}

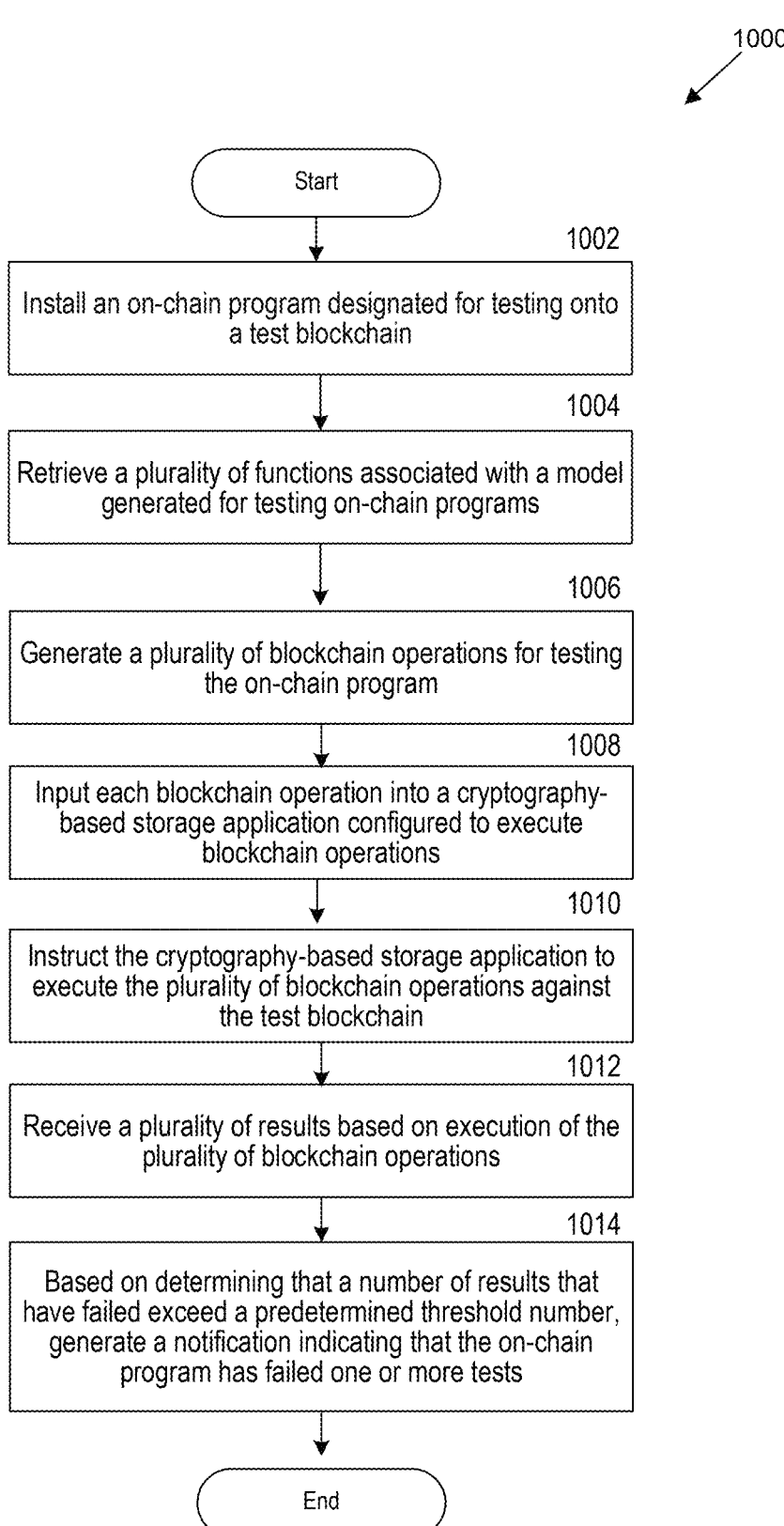

1000A

Start

1002

Install an on-chain program designated for testing onto a test blockchain

1004

Retrieve a plurality of functions associated with a model generated for testing on-chain programs

1006

Generate a plurality of blockchain operations for testing the on-chain program

1008

Input each blockchain operation into a cryptography-based storage application configured to execute blockchain operations

1010

Instruct the cryptography-based storage application to execute the plurality of blockchain operations against the test blockchain

1012

Receive a plurality of results based on execution of the plurality of blockchain operations

1014

Based on determining that a number of results that have failed exceed a predetermined threshold number, generate a notification indicating that the on-chain program has failed one or more tests End

*FIG. 10A*

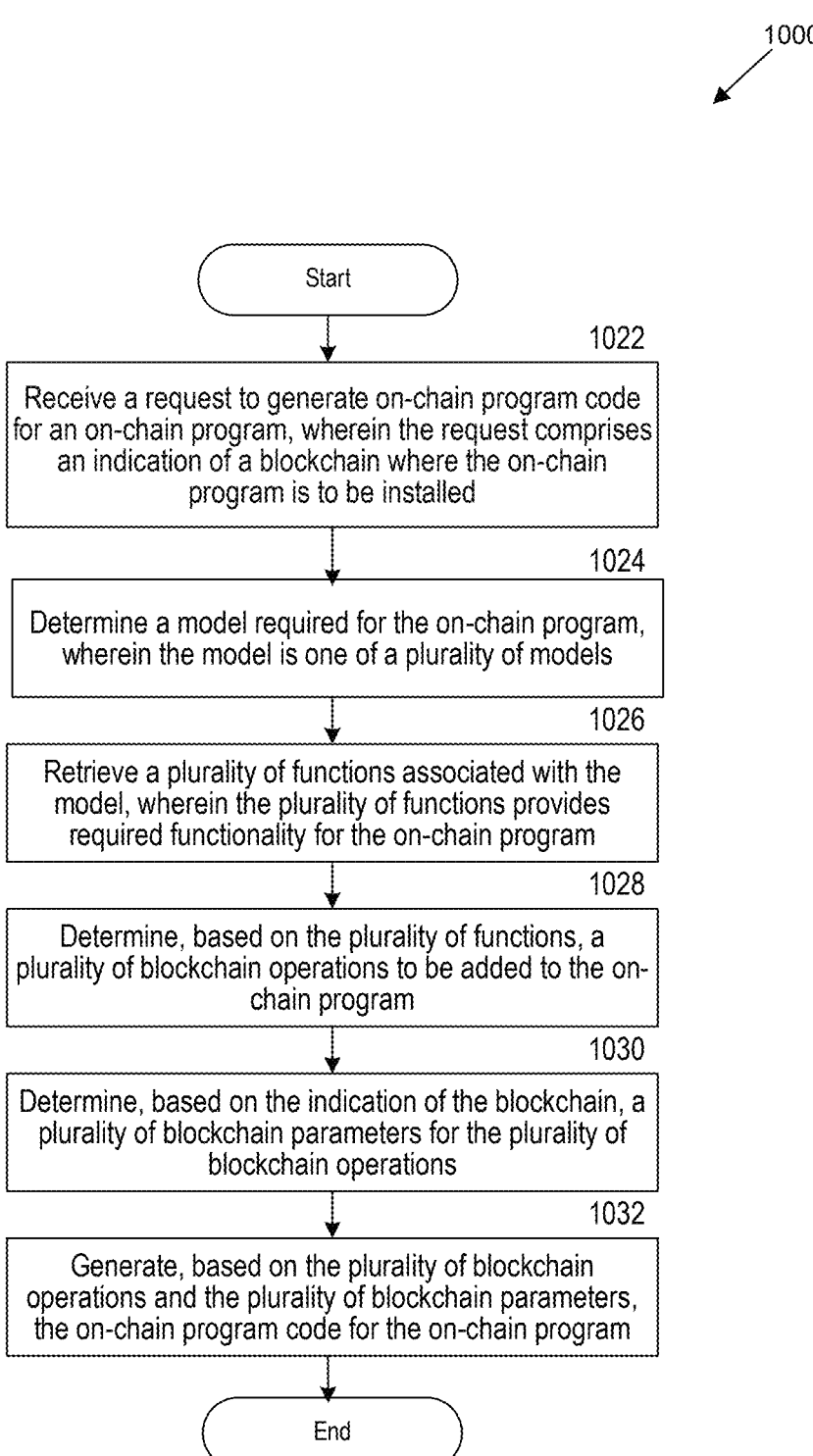

1000B

Start

1022

Receive a request to generate on-chain program code for an on-chain program, wherein the request comprises an indication of a blockchain where the on-chain program is to be installed

1024

Determine a model required for the on-chain program, wherein the model is one of a plurality of models

1026

Retrieve a plurality of functions associated with the model, wherein the plurality of functions provides required functionality for the on-chain program

1028

Determine, based on the plurality of functions, a plurality of blockchain operations to be added to the on-chain program

1030

Determine, based on the indication of the blockchain, a plurality of blockchain parameters for the plurality of blockchain operations

1032

Generate, based on the plurality of blockchain operations and the plurality of blockchain parameters, the on-chain program code for the on-chain program End

*FIG. 10B*

TESTING FUNCTIONALITY OF AND GENERATING ON-CHAIN PROGRAMS

BACKGROUND

In recent years, bad actors have become increasingly skilled at generating on-chain programs that exhibit malicious behavior. These on-chain programs behave normally during their early phases of execution. However, at a certain point (e.g., based on a malicious actor's command or at a particular time), the on-chain program executes malicious code, thereby exhibiting malicious behavior and damaging user accounts. These on-chain programs are difficult to identify beforehand as the malicious behavior is usually hidden and user accounts are not affected until the malicious code is executed. Accordingly, there is a need for testing on-chain programs for malicious behavior and generating on-chain programs that are free of malicious code.

SUMMARY

One mechanism for testing on-chain programs involves retrieving that on-chain program from a blockchain and deploying that on-chain program onto a test blockchain. The system may then use formal verification models or similar mechanisms to determine whether the on-chain program is malicious. In particular, a verification system may be used to perform formal model operations. The verification system may receive from a public blockchain node of a public blockchain an on-chain program designated for testing. For example, the verification system may monitor the public blockchain for new on-chain programs. In another example, an operator may trigger the retrieval of the on-chain program by requesting that a particular on-chain program be retrieved by the verification system.

The verification system may then cause the on-chain program to be deployed onto a test blockchain network. In particular, the verification system may transmit a command to a test blockchain node to install the on-chain program onto a test blockchain. For example, the verification system may have access to a test blockchain network via a test blockchain node. The blockchain node may accept commands from the verification system.

When the on-chain program is ready to be tested (e.g., deployed on a test blockchain network), the verification system may identify functions for testing the on-chain program (e.g., using a formal model). Thus, the verification system may retrieve a plurality of functions associated with a formal model generated for testing on-chain programs. For example, a formal model for testing a particular on-chain program may require a specific set of tests to ensure that the results of those tests match the expected results. The verification system may retrieve that formal model and the corresponding functions.

The verification system may then generate blockchain commands for each function to be executed on the test blockchain. In particular, the verification system may generate, based on each function of the multitude of functions, a plurality of blockchain operations for testing the on-chain program. For example, the verification system may iterate through each function and generate a corresponding blockchain operation that is enabled to be executed on the test blockchain via the blockchain node. In another example, the verification system may retrieve a list of required functions and determine, for each required function, corresponding blockchain code. The verification system may then modify the blockchain code for a particular instance of the test blockchain.

Once each blockchain operation is generated, the verification system may use a cryptography-based storage application to execute the blockchain operations (e.g., send each command to a blockchain node of the test blockchain for execution). In particular, the verification system may input each blockchain operation of the plurality of blockchain operations into a cryptography-based storage application. The cryptography-based storage application may be configured to execute blockchain operations against the test blockchain using a blockchain node that is part of the test blockchain. Thus, the verification system may instruct the cryptography-based storage application to execute the plurality of blockchain operations against the test blockchain.

When the verification system executes (e.g., via the cryptography-based storage application) the blockchain operations (e.g., using the test blockchain node), the verification system may receive the results of the blockchain operations. In particular, the verification system may receive, from the test blockchain node via the cryptography-based storage application, a plurality of results based on execution of the plurality of blockchain operations. For example, the blockchain operations may test how the on-chain program behaves when different operations are executed against the on-chain program. One such blockchain operation may involve determining how swapping different blockchain tokens via the on-chain program affects where and how the tokens are allocated.

The verification system may then compare results received from the tests with expected results. In particular, the verification system may compare each result of the plurality of results with each corresponding expected result associated with a corresponding function of the plurality of functions. For example, each blockchain operation (e.g., as stored within a formal model) may have a corresponding expected result. Each expected result may be compared with the actual result of the blockchain operation that is received from the test blockchain node.

Based on determining that one or more results of the plurality of results do not match a corresponding expected result associated with the corresponding function of the plurality of functions, the verification system may generate a notification indicating that the on-chain program has failed one or more tests. For example, if, after a particular blockchain token swap operation, the tokens are not transferred as expected, the verification system may indicate a test failure.

In some embodiments, the verification system may identify the tests that have failed and determine, based on the tests, corresponding malicious activities. The verification system may then add identifiers of those malicious activities to the notification.

This mechanism may also be used for generating on-chain programs or modifying on-chain programs that do not have the functionality required by a corresponding formal model. That is, this mechanism may be built into a generation system. In particular, the generation system may receive a request to generate on-chain program code for an on-chain program. The request may include an indication of a blockchain where the on-chain program is to be installed. For example, a developer may desire to create an on-chain program. However, the developer may want that on-chain program to be compliant with one or more systems. Thus, the developer may request to generate the on-chain program with all the functionality that is required to be compliant and then add other code into the on-chain program. Thus, the developer may request that an on-chain program be generated.

In some embodiments, the on-chain program may be modified instead of generated. For example, the developer may generate an on-chain program and add the functionality desired (e.g., by users). The developer may then request that the on-chain program be modified to include required program code so that the on-chain program is compliant with various systems. Thus, the developer may request and the generation system may receive the request to modify the on-chain program.

Based on the request, the generation system may determine which formal model is required for the on-chain program. In particular, the generation system may determine, based on the request, a formal model required for the on-chain program. The formal model may be one of a plurality of formal models. Furthermore, each formal model may include a corresponding function group. For example, different types of on-chain applications may be required to comply with a particular set of rules or systems. Each formal model may be generated for complying with a particular set or multiple sets of rules or systems. Thus, the generation system may identify the formal model that is required for the particular on-chain program being created.

The generation system may then retrieve a plurality of functions associated with the formal model. The plurality of functions may provide required functionality for the on-chain program. For example, a particular formal model may require four specific functions to be supported or executed in a particular way. Thus, the formal model may include those functions. One function may describe what happens when an individual tries to exchange one type of token for another type of token using the on-chain program.

The generation system may then determine, based on the function, the particular blockchain operations required to be supported by the on-chain program. In particular, the generation system may determine, based on the plurality of functions, a plurality of blockchain operations to be added to the on-chain program. Each blockchain operation may correspond to a function of the plurality of functions. For example, the generation system may iterate through each function and determine a corresponding blockchain operation.

The generation system may then determine parameters for the blockchain operations. In particular, the generation system may determine, based on the indication of the blockchain, a plurality of blockchain parameters for the plurality of blockchain operations. For example, the parameters may include a type of tokens that the on-chain program may swap, the type of blockchain that is supported, etc. The generation system may then generate, based on the plurality of blockchain operations and the plurality of blockchain parameters, the on-chain program code for the on-chain program. For example, the generation system may create the code from the blockchain operations and add the parameters required. Once the parameters are added, the generation system may add the corresponding code to the on-chain program.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise.

In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates an exemplary on-chain program designated for testing, in accordance with one or more embodiments of this disclosure.

FIG. 3A illustrates exemplary functions for testing an on-chain program, in accordance with one or more embodiments of this disclosure.

FIG. 3B illustrates exemplary blockchain operations for testing an on-chain program, in accordance with one or more embodiments of this disclosure.

FIG. 10A is a flowchart of operations for testing on-chain program code, in accordance with one or more embodiments of this disclosure.

FIG. 10B is a flowchart of operations for generating on-chain program code, in accordance with one or more embodiments of this disclosure.

DETAILED DESCRIPTION

Figure 1A:
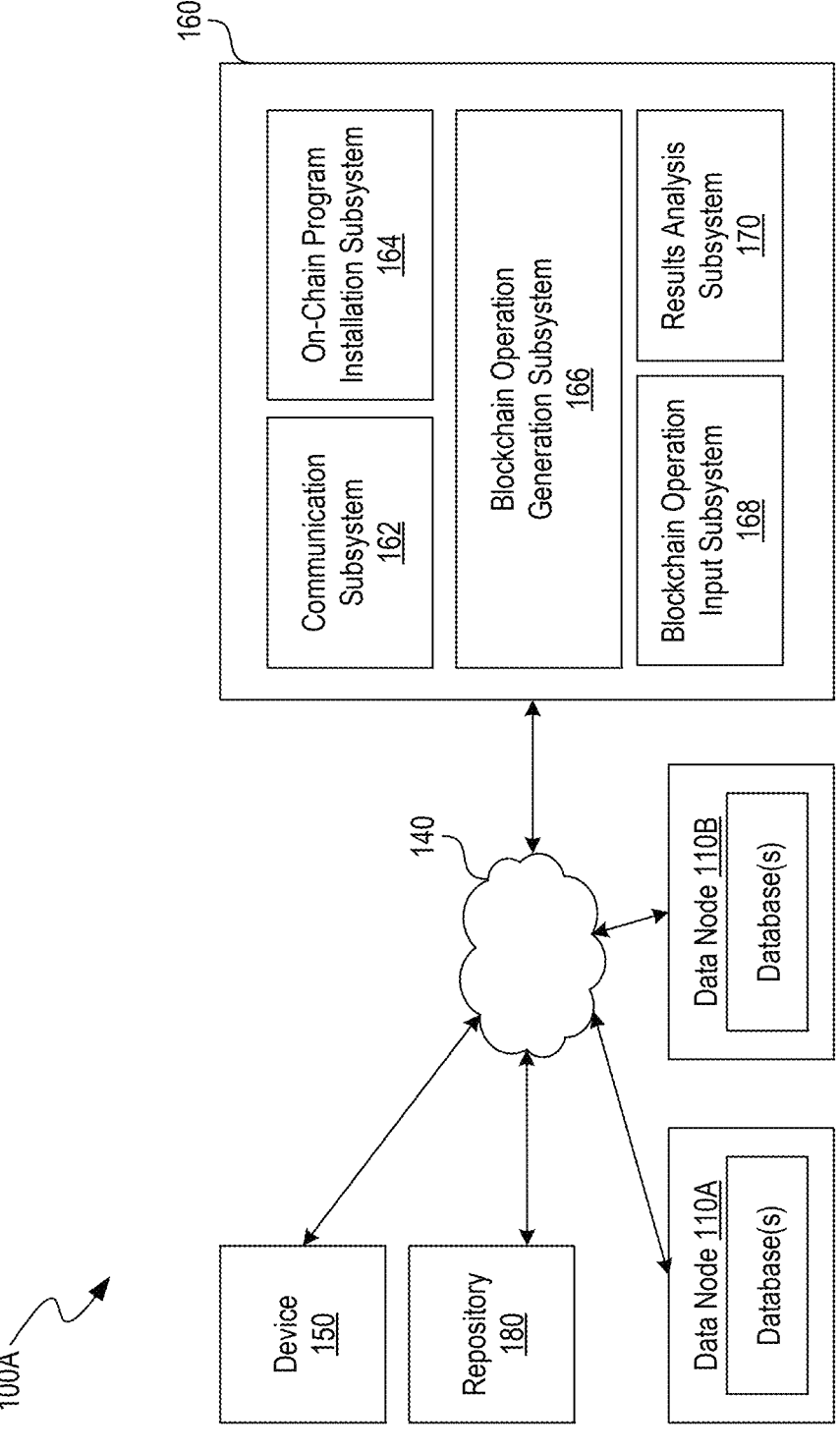
FIG. 1A shows an illustrative system for testing on-chain program code, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Attempting to create a system to test and generate on-chain programs to ensure security and safety in view of the available conventional approaches created significant technological uncertainty. Creating such systems required addressing several unknowns in conventional approaches in testing and generating such programs.

One such issue is resource expenditure. In particular, conventional on-chain programs, such as blockchain programs and smart contracts, cannot be modified once deployed. This makes it difficult to provide for an iterative process in debugging without significant computational expense. Furthermore, testing on a main blockchain can incur heavy gas fees, making testing a computationally- and resource-expensive process. Because tens of thousands of smart contracts are being deployed daily, many small bugs can fly under the radar.

Another such issue is the testing of programs against dynamic, ever-changing legal or entity-specific standards. For example, existing systems test on-chain programs for technical issues and never consider legal standards, e.g., such as those set forth by Uniform Commercial Code Article 12 (UCC-12), which dictates legal transactions amongst digital assets. However, even when on-chain programs compile and run without errors, the programs may still be malicious and violate several legal standards that cannot be tested using conventional techniques.

Conversely, the disclosed system provides a system that enables the testing of on-chain programs using standards and models set by various entities, e.g., such as the UCC standards. The new system may identify a formal model that tests for adherence to standards set by a government agency, a company, or other entity and generates blockchain operations to test that the on-chain program adheres to the model. Since regulations and guidelines from the government and different companies may be dynamic over time, the system enables testing and code generation to be based off of a model, which may be subject to change over time. By referencing a model as opposed to hard-programming specific functions, the system may be enabled to leverage and match up preexisting functions to perform new functionality rather than expending time and computational resources in developing and generating new functions.

In particular, to overcome the technological uncertainties, the inventors systematically evaluated multiple design alternatives. For example, the inventors use modular functions and blockchain operations that can be used in common with different models, e.g., different models may use the same blockchain operations and functions. By doing so, space can be saved by simply identifying the operations and functions by identifier so no duplicates exist.

However, this introduced more uncertainties, as using the same functions and syntax over different on-chain programs does not always work given context-specific variables and parameters. In order to solve this, the inventors made the blockchain operations and on-chain code parameterized so that the same blockchain operations can be used over different models and programs but memory space can be saved by avoiding storing different variations of the same operation. In this way, specific parameters can be used and input so as to make the blockchain operations operable and executable within the specific context of the on-chain program. By doing so, not only did the inventors enable testing and generation of code that is automatic and time-effective, but they also enabled a less resource-intensive system through modular architecture.

As mentioned herein, the modular architecture is also enabled for dynamic models, as new models may use existing functions and operations from a superset of functions and operations rather than developing new functions and operations over time. Thus, the system is enabled to leverage and match up preexisting functions to perform new functionality rather than expending time and computational resources in developing and generating new functions.

The system allows for generation of code, which created further technological uncertainty for the inventors since legacy approaches only enable users to identify problems and debug the programs themselves. However, in order to ensure that programs can deploy quickly so that services won't be interrupted and in order to conserve computational resources, systems herein are enabled to generate necessary code and insert/modify on-chain programs to adhere to regulations and guidelines set by different entities. Legacy systems do not enable generation of on-chain code, and so the inventors considered many technical uncertainties, such as how to quickly test and deploy on-chain programs, modular architectures for functions and models that are memory-space efficient, and testing and generating code that is secure and deployable.

Thus, the inventors experimented with different methods for testing and generating on-chain program code. For example, the inventors tried different architectures for storing blockchain operations, functions, and models to identify the most efficient and effective approaches.

As described herein, in order to protect against on-chain programs from executing malicious code, on-chain programs may be tested and validated to ensure safety to users who may use such on-chain programs to perform various actions with their accounts. Environment 100A of FIG. 1A shows an illustrative system for testing on-chain program code. Environment 100A includes on-chain program verification system 160, data node 110A, data node 110B, device 150, and repository 180.

On-chain program verification system 160 of environment 100A may execute instructions for testing on-chain programs and may additionally communicate results of testing an on-chain program to an operator or operator device. On-chain program verification system 160 may include several subsystems, each configured to perform one or more steps of the methods described herein, such as communication subsystem 162, on-chain program installation subsystem 164, blockchain operation generation subsystem 166, blockchain operation input subsystem 168, and results analysis subsystem 170.

On-chain program verification system 160 may include software, hardware, or a combination of the two. For example, on-chain program verification system 160 may be hosted on a physical server or a virtual server that is running on a physical computer system. In some embodiments, on-chain program verification system 160 may be configured on a user device (e.g., a laptop computer, a smartphone, a desktop computer, an electronic tablet, or another suitable user device).

On-chain program verification system 160 may be in communication (e.g., via network 140) with a data node 110A, through which the system may access a public blockchain. For example, data node 110A may be a public blockchain node of a public blockchain. Data node 110A may store various data, including user data, copies of on-chain programs, and/or other suitable data. Data node 110A may include software, hardware, or a combination of the two. For example, data node 110A may be a physical server or a virtual server that is running on a physical computer system. In some embodiments, the verification system and data node 110A may reside on the same hardware and/or the same virtual server/computing device. Network 140 may be a local area network, a wide area network (e.g., the Internet), or a combination of the two.

Devices such as device 150 may be associated with a cryptography-based storage application used at the data nodes. A cryptography-based storage application may also include software, hardware, or a combination of the two. For example, each cryptography-based storage application may include software executed on one or multiple devices or may include hardware, such as a physical device. In some cases, the cryptography-based storage application may be software and may be stored in user devices (e.g., client devices such as smartphones, laptops, electronic tablets, etc.), and a user of the cryptography-based storage application may access the cryptography-based storage application on those devices. Alternatively, or additionally, the cryptography-based storage application may reside on a special device (e.g., a fob) intended for storing the cryptography-based storage application. For example, the device may store private keys in a memory of the device and allow transactions to be signed (e.g., via generating a cryptographic signature) on the device itself. Examples of cryptography-based storage applications may include cryptographic wallets. For example, a cryptography-based storage application may be referred to as a digital wallet (e.g., hot wallet, cold wallet, etc.). As described herein, some examples of hardware cryptographic wallets include Ledger® and Trezor®. Software cryptographic wallets may include Metamask® and others.

Communication subsystem 162 of on-chain program verification system 160 may be used to receive an on-chain program designated for testing, such as from a public blockchain accessed through data node 110A via network 140. Communication subsystem 162 may include software components, hardware components, or a combination of both. For example, communication subsystem 162 may include a network card (e.g., a wireless network card and/or a wired network card) that is associated with software to drive the card. Communication subsystem 162 may pass at least a portion of the data, or a pointer to the data in memory, to other subsystems such as on-chain program installation subsystem 164, blockchain operation generation subsystem 166, blockchain operation input subsystem 168, and results analysis subsystem 170.

In some examples, prior to deploying an on-chain program, entities such as operators may request that an on-chain program be tested, e.g., to ensure that the program is in accordance with guidelines or laws. In this case, communication subsystem 162 may receive the on-chain program as part of a request. Alternatively, or additionally, on-chain program verification system 160 may monitor a blockchain for new on-chain programs and retrieve the programs from the blockchain via communication subsystem 162 for testing.

As described herein, an on-chain program or on-chain program code may refer to a computer program or any suitable code for performing computing operations stored on a blockchain. For example, an on-chain program may reference a program stored on a blockchain or other distributed ledger. In particular, an on-chain program may be used to automate the execution of a transaction, such as a blockchain operation. In some examples, an on-chain program may refer to a smart contract executed on a blockchain. In one example, an on-chain program may run when predetermined conditions are satisfied.

For example, FIG. 2 illustrates an exemplary on-chain program 200 designated for testing, in accordance with one or more embodiments of this disclosure. For example, the on-chain program 200 includes a smart contract for minting "contract_mint" that sends an amount of newly created coins to an address and can only be called by the contract creator. The communication subsystem 162 may pass the on-chain program, or a pointer to the program in memory, to on-chain program installation subsystem 164.

The on-chain program installation module may install the on-chain program onto a test blockchain. As referred to herein, a test blockchain may be a blockchain environment that replicates a main blockchain. In some instances, the test blockchain may be used exclusively for testing and development purposes. Test blockchains may include testnets such as Ethereum Testnets, Binance Smart Chain Testnets, etc. By using test blockchains, the system can avoid incurring financial losses and also may reduce gas costs and optimize performance.

In some examples, on-chain program verification system 160 may be in communication (e.g., via network 140) with a data node 110B, through which the system may access a test blockchain. For example, data node 110B may be a test blockchain node of a test blockchain. Data node 110B may store various data, including user data, copies of on-chain programs, and/or other suitable data. Data node 110B may include software, hardware, or a combination of the two. For example, data node 110B may be a physical server or a virtual server that is running on a physical computer system. In some embodiments, the verification system and data node 110B may reside on the same hardware and/or the same virtual server/computing device.

As described herein, the on-chain program installation subsystem 164 may be configured to install an on-chain program, including by transmitting a command to a test blockchain node, such as via data node 110B, to install the on-chain program designated for testing onto a test blockchain. In some examples, installing the on-chain program may include selecting a test blockchain from a plurality of test blockchains for which testing the on-chain program is suitable. For example, the system may consider the type of program, the type of digital asset involved in the program, the syntax of the program, and/or keywords from the program to determine which test blockchain to use. In some examples, the program itself may indicate the test blockchain to use. In some embodiments, the system may obtain test tokens for testing purposes. In some embodiments, the system may further compile the program.

In order to test the program, on-chain program verification system 160 may determine suitable tests to execute and retrieve results from. For example, the on-chain program verification system 160 may retrieve functions, such as those associated with a model generated for testing on-chain programs. The system may then generate, based on each function, blockchain operations for testing the on-chain program. The blockchain operation input subsystem 168 may later execute those blockchain operations to test the on-chain program.

As described herein, an operator or entity may seek to test or otherwise validate the on-chain program, such as to identify suspicious snippets of code that, when executed, may cause damage to one or more users. One way of doing so may include checking that the program functions correctly or as expected according to a specific guideline or model. According to some examples, the model may be set by operators, such as testers. In other examples, the model may be in accordance with legal requirements, such as UCC-12.

Figure 8:
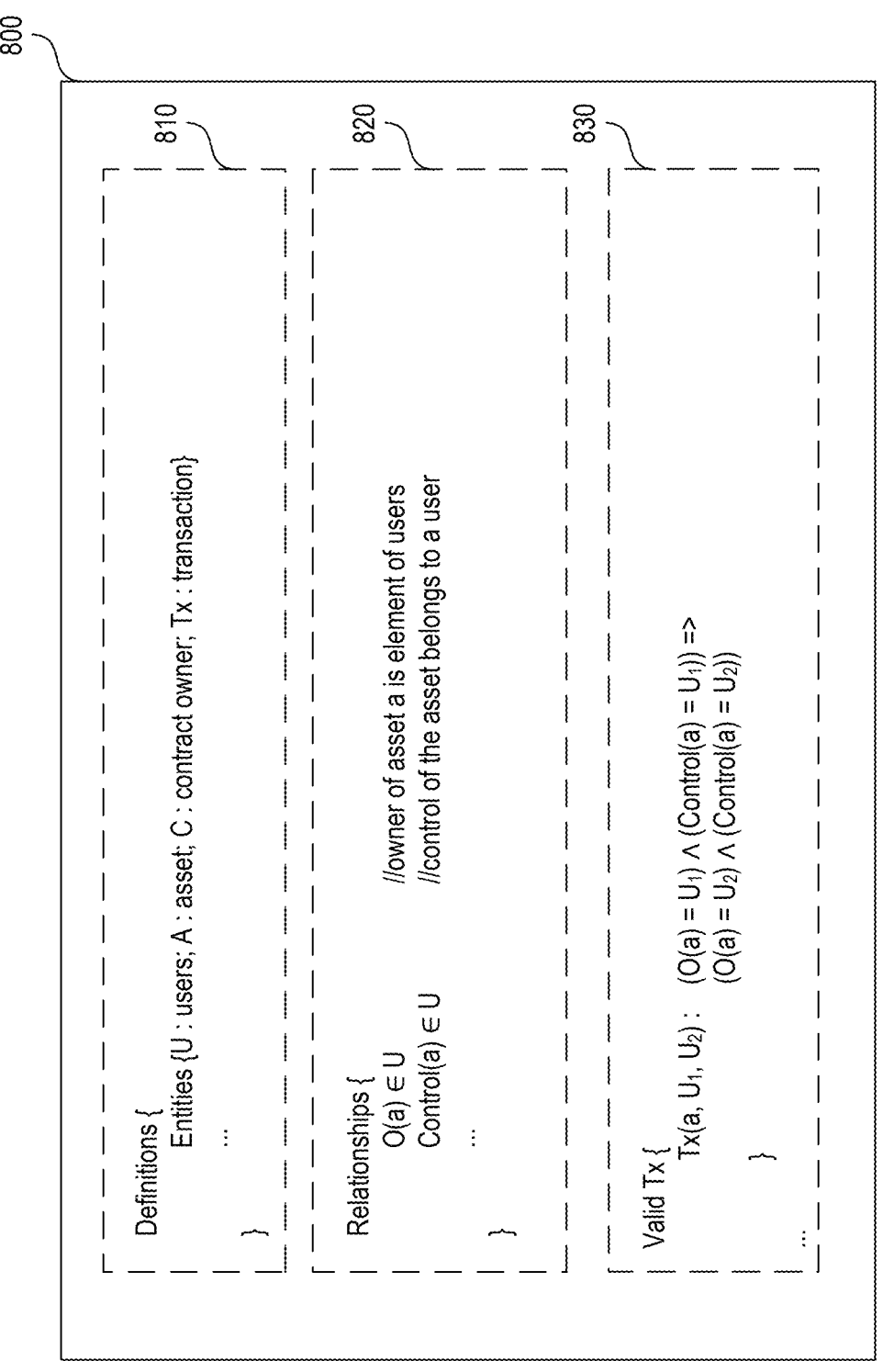
FIG. 8 illustrates an exemplary formal model such as can be used in generating or testing on-chain program code, in accordance with one or more embodiments of this disclosure.

The model may be a formal model, wherein a formal model may include a set of components and relationships used to characterize a structure for at least one on-chain program. In particular, the formal model may be a logical representation of how a system would perform, such as a system in compliance with a guideline (e.g., UCC-12). A formal model may be defined with components, rules, symbols, and/or structures that provide a rigorous framework for analyzing, verifying, and reasoning about system behavior. FIG. 8 is an exemplary formal model 800 that can be used in generating or testing on-chain program code, in accordance with one or more embodiments of this disclosure. In the case where the on-chain program is submitted as part of a request to test the program, the request may indicate which model(s) to test against using identifiers. The system can identify the model(s) from a repository of models, whether remote or local, to test against and retrieve them.

In the example of FIG. 8, the formal model 800 is a plaintext file with definitions 810, relationships 820, and operations 830. Although formal model 800 is represented in plaintext in set notation and logical representation, a formal model may also be stored as programmatic code, compiled code, or data structures stored in one or more files. The formal model 800 corresponds to Uniform Commercial Code (UCC) Article 12, or UCC-12, which is a section of the UCC that governs the transfer of Controllable Electronic Records (CERs), where CERs include digital assets that can be owned and controlled (e.g., Bitcoin and NFTs); however, it can be appreciated that a model may adhere to any guideline, including governmental (e.g., public) or entity-specific (e.g., private). The formal model may include definitions 810, which include definitions for entities such as "Entities {U: users; A: asset; C: contract owner; Tx: transaction}." The formal model may also specify relationships 820, which indicate what suitable or correct relationships look like when the on-chain program is performing in accordance with a guideline (e.g., UCC-12). For example, when an on-chain program exhibits activity that indicates that one or more of the relationships is not satisfied or violated, the on-chain program being tested can be said to not be in accordance with the formal model.

In the example of FIG. 8, the relationships include "O(a) $\in$U," indicating that an owner "O" of an asset "a" is an element of the group "U" of users and "Control(a)$\in$U," indicating that control of the asset "a" belongs to a user in the group "U." The formal model 800 may also include operations such as operations 830. Operations 830 depict an operation "Valid Tx {Tx(a, U1, U2):(O(a)=U1)$\wedge$(Control (a)=U1))$\Rightarrow$(O(a)=U2)$\wedge$(Control(a)=U2))}" illustrating that a valid transaction in accordance with the formal model would logically follow the specified definition. The operation indicates that a valid transaction "tx" of an asset "a" from a user U1 to a user U2 is defined as being possible if "U1" is the owner of asset "a" (e.g., "O(a)") and also has control of the asset "a" (e.g., "Control(a)=U1) and the new owner would be "U2" and control would also be given to "U2" (e.g., "(O(a)=U2)$\wedge$(Control(a)=U2)"). In the example of formal model 800, the operations and relationships may be positive and identify correct operations or relationships. However, the formal model may also include negative operations or relationships, which identify what types of operations or relations are not allowed or not in accordance with the formal model. One example may include, for example, the following: "Invalid Tx {Tx(a, U1, U2):

(¬O(a)=U1)$\wedge$(Control(a)=U1))$\Rightarrow$(O(a)=U2)$\wedge$ (Control(a)=U2))}." That is, where a first user does not have ownership of the asset, the transfer of the asset to a second user from a first user is invalid and therefore not in compliance with the guidelines.

According to some examples, the formal model 800 can be generated by scraping text, e.g., from a website, images, or other media (e.g., using OCR or ASR). In particular, the formal model 800 may periodically review legal websites and scrape text and convert the text, e.g., to set notation for the formal model, programmatic code, and/or the like, such as using machine learning. Since guidelines may be updated periodically, the system may be configured to periodically scrape text from known URLs or links and input the text into a machine learning model configured to generate the formal model in a suitable format (e.g., set notation, logical representation, code, etc.). Alternatively, or additionally, the formal model may be input or otherwise edited (e.g., via a user or operator device) via one or more input techniques (e.g., keyboard, touch screen, gesture recognition, voice commands, etc.).

As described herein, in order to generate blockchain operations for testing the on-chain program, blockchain operation generation subsystem 166 may retrieve a plurality of functions associated with a formal model generated for testing on-chain programs. In some examples, the functions may be operations or relationships within the formal model, such as formal model 800. For example, the functions may provide required functionality for the on-chain program. In the example of formal model 800, the operation for a valid transaction "valid_tx" may be a function.

Alternatively, or additionally, the functions may not be the operations or relationships themselves, but they may instead be associated with the operations or relationships within the formal models and used to test the on-chain program. For example, in order to test the operation "valid_tx" to ensure all transactions possible when executing the on-chain program follow the valid_tx framework, functions to test invalid operations and valid operations can be used. In one example, the functions can include functions such as trying to execute a transaction when a user owns an asset but lacks control over the asset, trying to execute a transaction when a user has control over the asset but no ownership, trying to execute a transaction without transferring ownership, trying to execute a transaction without transferring control, trying to execute a transaction correctly, e.g., by transferring control and ownership, or the like. Similarly, the functions may be used to test the relationships, such as attempting to create ownership for a non-user (e.g., to test "O(a)$\in$U").

According to some examples, the system may generate functions based on the operations or relationships defined in the formal model. Alternatively, or additionally, the functions can be retrieved, such as from internal or external memory or a repository. For example, the system may generate commands or search queries to obtain the functions from memory or from a repository (e.g., such as repository 180) to be obtained via communication subsystem 162.

Alternatively, or additionally, the formal model may be generated based on required functions. In some examples, the on-chain program verification system 160 may retrieve a list of required functions for testing one or more on-chain programs. The list may include the functions themselves (e.g., function definitions or compiled versions of the functions) or may include identifiers for the functions. In one example, the system may retrieve the list by receiving an indication of a function group that includes requirements for the on-chain program and determining, based on the function group, the list of required functions. For example, the system may determine that the on-chain program is used to transfer specific types of assets and, based on that indication, may obtain functions specific to testing the asset type. Based on the list of required functions, the system may retrieve corresponding blockchain code associated with the required functions and generate, using each corresponding blockchain code, a formal model for testing the on-chain programs.

FIG. 3A illustrates exemplary functions for testing an on-chain program, in accordance with one or more embodiments of this disclosure. For example, data structure 300 includes functions for testing invalid transactions with users who have no ownership "¬O(a)=U1)∧(Control(a)=U1))⇒ (failure)" and with users who have no control "O(a)=U1)∧ (¬Control(a)=U1))⇒(failure)" attempting to make a transaction. The expected result in each case should yield no change in the blockchain state since the transaction should not go through if the on-chain program is in accordance with the formal model.

Blockchain operation generation subsystem 166 may then generate, based on each function of the plurality of functions, a plurality of blockchain operations for testing the on-chain program. In this way, the on-chain program verification system 160 can execute blockchain operations on the test blockchain to test the on-chain program without any consequences on the main blockchain. For example, FIG. 3B illustrates exemplary blockchain operations for testing an on-chain program, in accordance with one or more embodiments of this disclosure.

According to some examples, generating the plurality of blockchain operations for testing the on-chain program may include selecting a first function of the plurality of functions. For example, the blockchain operation generation subsystem 166 may select the function "test_no_ownership" to check that the on-chain program would be in accordance with the formal model, e.g., will output an error when a user attempts to transact asset "a" when the user lacks ownership. The blockchain operation generation subsystem 166 may then determine one or more blockchain operations of the plurality of blockchain operations corresponding to the first function of the plurality of functions. For example, data structure 310 shows blockchain operations to generate a user without ownership of an asset (e.g., "generate_user_no_ ownership( )") and execute the on-chain program on the user (e.g., "execute(on_chain_program(user));"). In the example of data structure 310, the operations may simply be labeled by their operation name and not using the full blockchain operation code. This is because different models may utilize the same blockchain operations. Thus, by invoking the blockchain operation from memory (e.g., local or remote), the system can conserve memory space and computational resources by referencing only their identifying names. As described herein, using such a modular technique for the function and blockchain storage may conserve space and also enable testing against dynamic models that change over time.

Blockchain operation generation subsystem 166 may then retrieve first blockchain code corresponding to the first blockchain operation, e.g., from a repository or memory. For example, code for executing the on-chain program may include code to generate a new instance of the on-chain program deployed on the test blockchain (e.g., "const contract=new ethers·Contract(address, abi, wallet)"). The blockchain operation generation subsystem 166 may update the blockchain code with code parameters for executing on the test blockchain. For example, blockchain operation generation subsystem 166 may replace the address with that of the generated user and replace the contract with the on-chain program. This blockchain code may be added to the plurality of blockchain operations. The blockchain operation generation subsystem 166 may pass the plurality of blockchain operations, or a pointer to the data in memory, to blockchain operation input subsystem 168. The blockchain operation input subsystem 168 may then be used to input each blockchain operation of the plurality of blockchain operations into a cryptography-based storage application.

According to some examples, the cryptography-based storage application may be configured to execute blockchain operations against the test blockchain using a test blockchain node (e.g., node 110B). In particular, executing the operations may include deploying the operations by sending the operation and recording it in a block on the blockchain. In some examples, the cryptography-based storage application may be a test cryptography-based storage application generated, e.g., to test the blockchain operations. The test cryptography-based storage application may be accessible via one or more devices, such as data node 110B. Alternatively, or additionally, the cryptography-based storage application may belong to an operator of the network, operator of the smart contract, or operator at an entity so that an operator can monitor the performance of the on-chain program. The operator may access the cryptography-based storage application via an operator device, such as device 150.

The on-chain program verification system 160 may instruct the cryptography-based storage application to execute the plurality of blockchain operations against the test blockchain, e.g., such as through commands sent via the communication subsystem 162. For example, on-chain program verification system 160 may be in communication (e.g., via network 140) with a node contributing to a blockchain and that may execute operations on a blockchain node, such as data node 110A and data node 110B. Data node 110A and data node 110B may be any computer or processor configured to run a blockchain's software and to validate and store transactions on the network. Alternatively, or additionally, as described herein, an operator at device 150 may access the cryptography-based storage application and use device 150 to trigger execution of the blockchain operations for testing the on-chain program.

As described herein (e.g., FIG. 11), blockchain operations for testing the on-chain program may include transactions with specific parties. Once the operation is initiated (e.g., a transaction is initiated), the blockchain operation may be broadcast to all nodes on the network. Upon validation by nodes on the network, the operation may be grouped with others to form a block on the test blockchain. Once consensus is reached (e.g., using a consensus mechanism (like Proof of Work)), the new block can be added to the test blockchain, and all nodes can be updated with the new information.

In response, the communication subsystem 162 may receive a plurality of results based on execution of the plurality of blockchain operations from the test blockchain node via the cryptography-based storage application. For example, device 150 and/or data node 110B may be used to access and obtain results of executing the blockchain operations. Communication subsystem 162 may pass results, or a pointer to the data in memory, to the results analysis subsystem 170, which may be configured to review the results and determine whether or not the results are consistent with the formal model. For example, based on determining that a number of results that have failed exceed a predetermined threshold number, the results analysis subsystem 170 may generate a notification, e.g., indicating that the on-chain program has failed one or more tests. The notification may be transmitted, such as to an operator or entity device (e.g., device 150), so that the operator or entity device may take further action, such as removing the on-chain program. In some embodiments, the on-chain program may be removed automatically by the system if more than a threshold number of tests fail. The threshold number of tests may be configured by an operator associated with the model (e.g., government agency, operator at a private company, etc.), according to some embodiments. If the on-chain program has passed the tests (e.g., the blockchain operation data is consistent with expected results), a notification indicating success may also be transmitted.

In some examples, reviewing the results may include comparing each result of the plurality of results with each corresponding expected result associated with a corresponding function of the plurality of functions. In the provided example of testing the blockchain operations for attempting a transaction where a user does not have ownership of the asset, the expected result would be no change in the blockchain state since the transaction should fail. In some examples, receiving the plurality of results may include receiving, from the test blockchain node, a plurality of hashes corresponding to the plurality of blockchain operations. The communication subsystem 162 may use the plurality of hashes to retrieve blockchain operation data from the test blockchain node, e.g., data node 110B. The blockchain operation data may be associated with each blockchain operation of the plurality of blockchain operations. For example, each hash of the plurality of hashes is used by the test blockchain node to retrieve blockchain data associated with a corresponding hash. The on-chain program verification system 160 may store the blockchain operation data in a data structure, e.g., such as for use downstream. For example, the on-chain program verification system 160 may transmit the data in raw format or as a report to the operator or entity via communication subsystem 162.

In this case, comparing results of the plurality of results with each corresponding expected result can include selecting a first portion of the blockchain operation data corresponding to a first hash. The on-chain program verification system 160 may select a first expected result of a plurality of expected results and compare outputs of the first portion of the blockchain operation data with expected outputs from the first expected result. The results analysis subsystem 170 may generate a failure flag for the first portion of the blockchain operation data based on the outputs of the first portion of the blockchain operation data not matching the expected outputs. For example, the results analysis subsystem 170 may generate a failure flag based on determining that one or more results of the plurality of results do not match a corresponding expected result associated with the corresponding function of the plurality of functions. If a threshold number of failure flags are accumulated during the testing session, the results analysis subsystem 170 may generate and transmit the notification as described herein.

Figure 4:
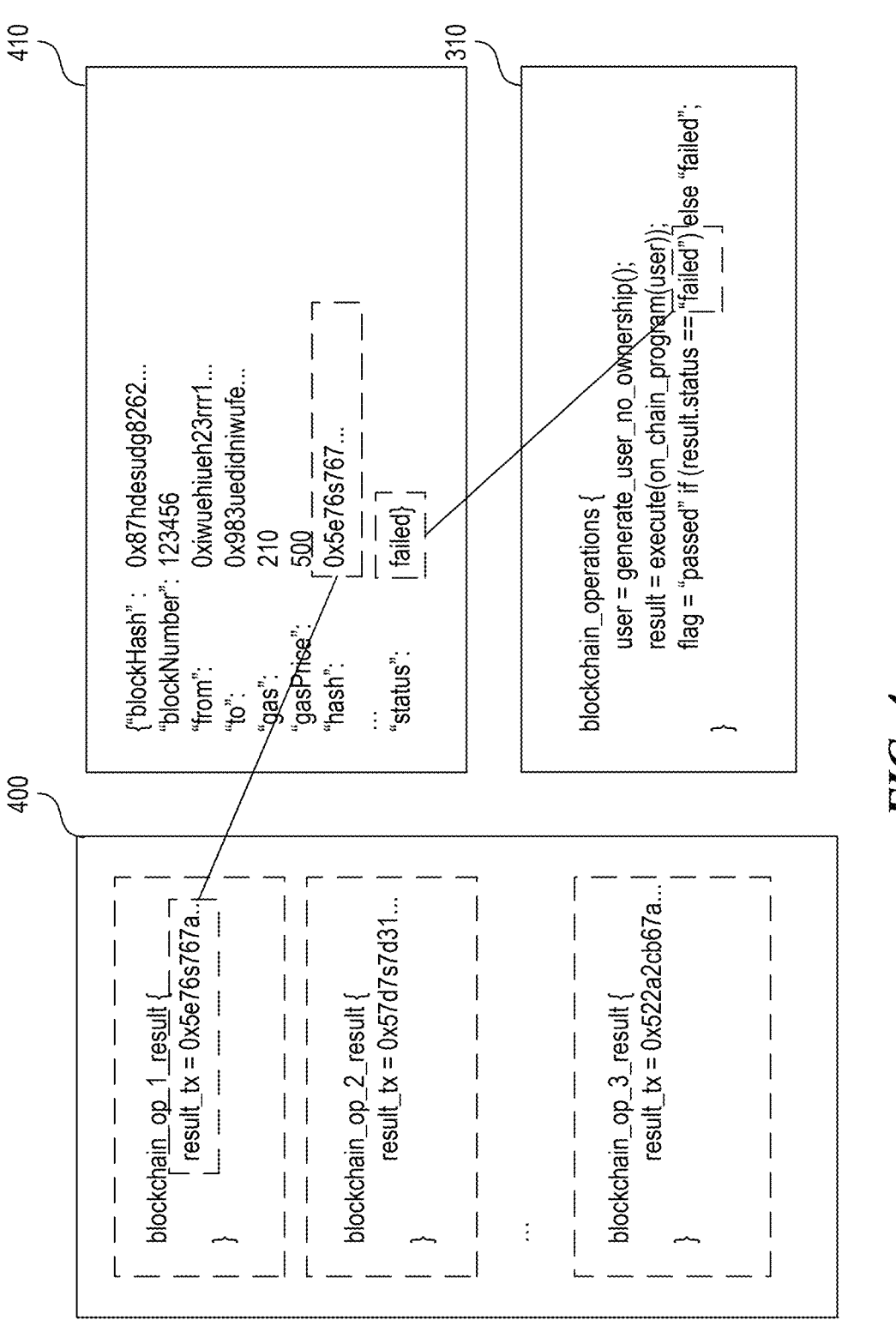
FIG. 4 illustrates exemplary results based on execution of the plurality of blockchain operations, in accordance with one or more embodiments of this disclosure.

FIG. 4 illustrates exemplary results based on execution of the plurality of blockchain operations, in accordance with one or more embodiments of this disclosure. For example, communication subsystem 162 may obtain a hash value such as transaction hash, e.g., "result_tx," "0x5c76s767a . . . " The results analysis subsystem 170 may programmatically fetch transaction data, such as through an API or using a blockchain explorer, etc. For example, data structure 410 includes blockchain data relating to the transaction. In the example of FIG. 4, data structure 410 includes blockchain data relating to an attempted transaction from a user without ownership. The blockchain data corresponds to data structure 310. Results analysis subsystem 170 may set the value of the flag as a failure or as passing if the test is passed, e.g., "flag='passed' if (result.status=='failed') else 'failed'". In the example of FIGS. 3A-B and FIG. 4, the flag is set to "passed" because the on-chain program did not allow a transaction where a user does not have ownership, in accordance with the formal model.

According to some embodiments, generating the notification indicating that the on-chain program has failed the one or more tests may also include identifying the one or more tests that have failed and determining, based on the one or more tests, one or more malicious activities associated with the one or more tests. For example, if the on-chain program enabled transmittal of assets where a user does not have control of the asset, the on-chain program verification system 160 may determine that the on-chain program enables fraudulent activity. The on-chain program verification system 160 may then add the one or more malicious activities to the notification.

In some embodiments, the on-chain program verification system 160 may further retrieve one or more blockchain code samples associated with the one or more tests that failed and generate, based on the one or more blockchain code samples, one or more code portions to replace blockchain code that failed. For example, if the on-chain program failed by enabling transactions even where a user only has ownership but not control over an asset, the on-chain program verification system 160 may generate code to ensure that such a transaction would fail and insert the code to replace the blockchain code that failed. The system may generate the blockchain code samples in a variety of ways, including using existing code samples or using a machine learning model to generate blockchain code.

Figure 1B:
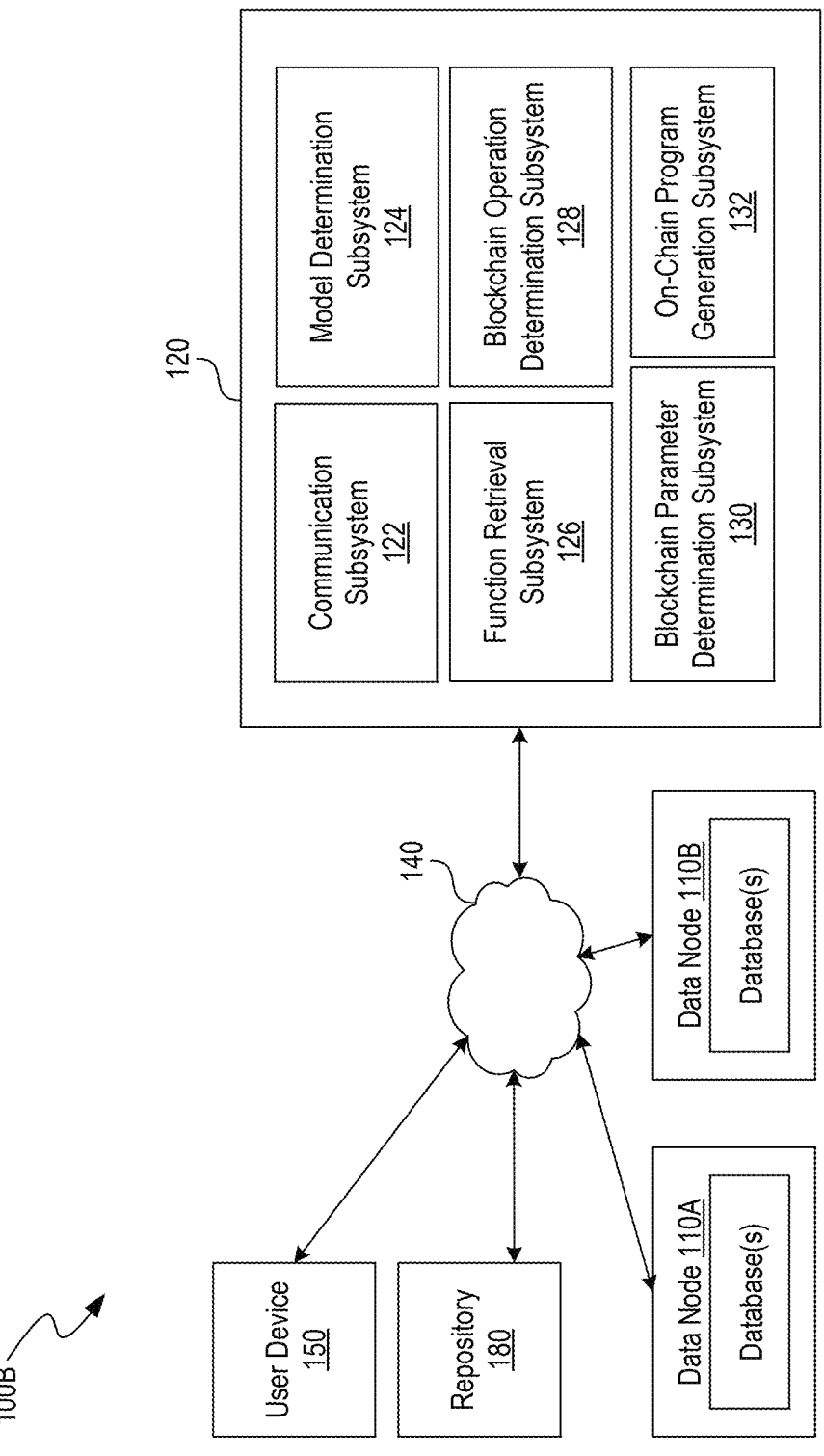
FIG. 1B shows an illustrative system for generating on-chain program code, in accordance with one or more embodiments of this disclosure.

As described herein, the techniques described herein may also be used for generating on-chain code, such as for on-chain programs that lack functionality required by a model (e.g., formal model) or for modifying on-chain programs to add code that will enable the on-chain programs to adhere to the requirements of the model. For example, environment 100B of FIG. 1B shows an illustrative system for generating on-chain program code. Although shown separately from the environment 100A for testing on-chain programs, environment 100A and environment 100B may share the same or similar elements and, in some cases, may be the same environment that can be used for both testing and generation of on-chain code.

Environment 100B includes on-chain program generation system 120, data node 110A, data node 110B, device 150, and repository 180. On-chain program generation system 120 of environment 100B may execute instructions for generating on-chain code or modifying existing on-chain programs, e.g., to enable on-chain programs to adhere to a model, e.g., such as a formal model. On-chain program generation system 120 may include several subsystems, each configured to perform one or more steps of the methods described herein, such as communication subsystem 122, model determination subsystem 124, function retrieval subsystem 126, blockchain operation determination subsystem 128, blockchain parameter determination subsystem 130, and on-chain program generation subsystem 132.

On-chain program generation system 120 may include software, hardware, or a combination of the two. For example, on-chain program generation system 120 may be hosted on a physical server or a virtual server that is running on a physical computer system. In some embodiments, on-chain program generation system 120 may be configured on a user device (e.g., a laptop computer, a smartphone, a desktop computer, an electronic tablet, or another suitable user device). According to some embodiments, the on-chain program generation system 120 may be hosted on the same device as the on-chain program verification system 160. In some embodiments, the systems are one system. In the case that the systems are one system, the communication subsystem 162 and communication subsystem 122 may be one and the same and may perform both functionalities described herein.

Communication subsystem 122 of on-chain program generation system 120 may be used to receive a request to generate on-chain program code for an on-chain program via network 140. Communication subsystem 122 may include software components, hardware components, or a combination of both. For example, communication subsystem 122 may include a network card (e.g., a wireless network card and/or a wired network card) that is associated with software to drive the card. Communication subsystem 122 may pass at least a portion of the request, or a pointer to the data in memory, to other subsystems such as model determination subsystem 124, function retrieval subsystem 126, blockchain operation determination subsystem 128, blockchain parameter determination subsystem 130, and on-chain program generation subsystem 132.

The communication subsystem 122 may receive the request from a user, such as an operator at a device 150, who seeks to have code generated or modified. Alternatively, or additionally, the request may have been generated as a result of determining that an on-chain program does not adhere to requirements set forth by a model, e.g., a formal model. For example, the request may be automatically generated, such as by on-chain program verification system 160, upon detecting that the on-chain program fails certain tests. According to some examples, the notification transmitted from the on-chain program verification system 160 may be the request or portions of the data from the notification may be used in generating the request.

Figure 5:
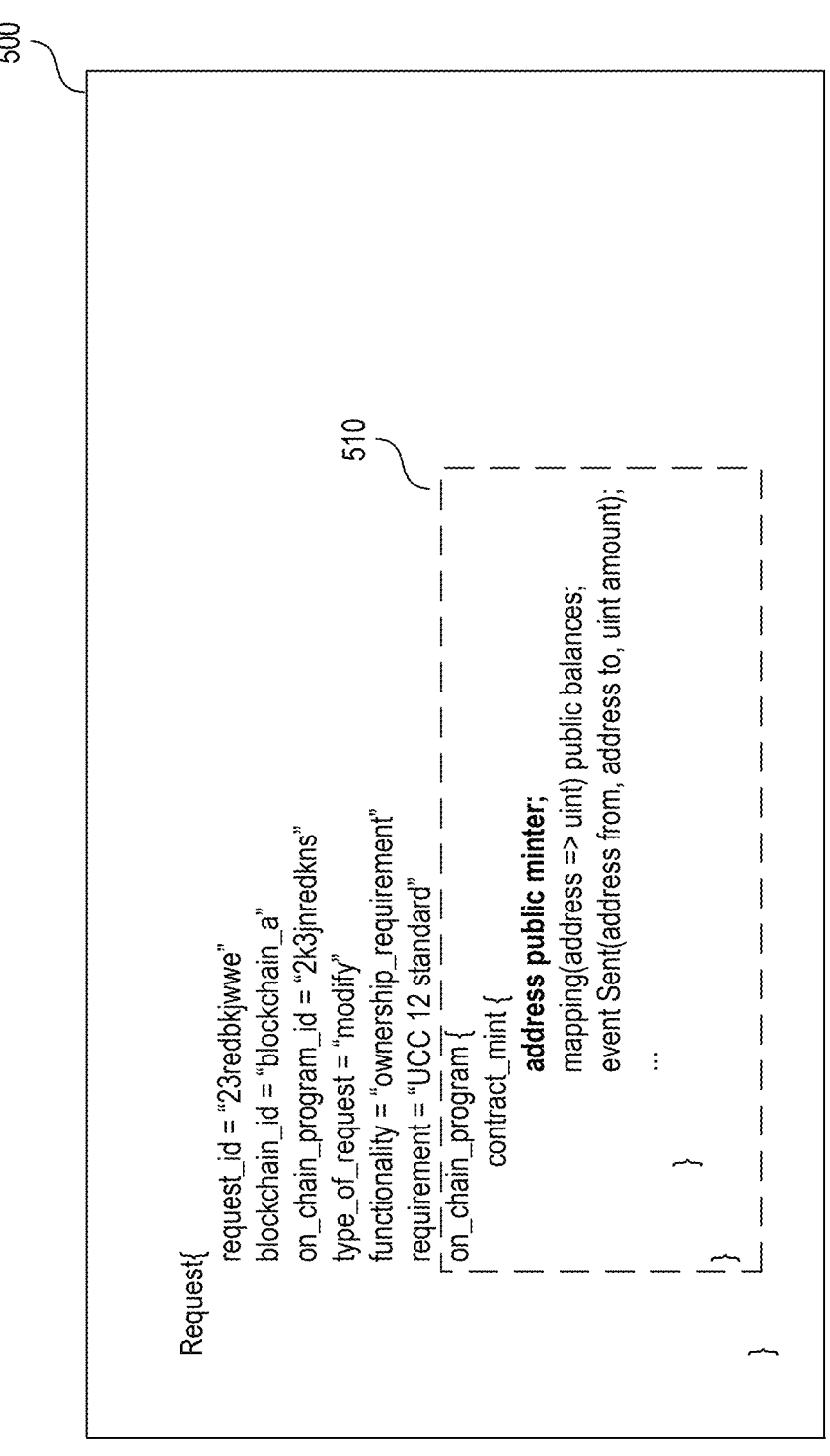
FIG. 5 illustrates a data structure that represents a request for generating on-chain program code, in accordance with one or more embodiments of this disclosure.

FIG. 5 illustrates a data structure 500 that represents a request for generating on-chain program code, in accordance with one or more embodiments of this disclosure. The request may include an indication of a blockchain where the on-chain program is to be installed, such as an identifier or name for the blockchain. For example, a chain identifier, a unique integer assigned to a blockchain network, may be used to differentiate between different blockchains. Similarly, the genesis block hash of the blockchain, the network ID, address format, or magic number may be used to identify which blockchain program the on-chain program is to be installed. The request may also include a request identifier "request_id" to enable searching and storing of different requests. The request identifier may be any unique alphanumeric string of characters.

In some embodiments, the request is for generation of a new on-chain program, e.g., based on an old on-chain program such that the new on-chain program, when executed, adheres to a model as described herein. The request may identify the old on-chain program through an on-chain program identifier or may optionally include the entirety or a snippet of code from the on-chain program as described in further detail herein. Alternatively, or additionally, the request may be for modification of an existing program. The request may indicate the on-chain program to be modified via an on-chain program identifier as well or may optionally include the entirety or a snippet of code from the on-chain program as described in further detail herein. The on-chain program identifier may be a blockchain address. For example, an on-chain program such as a smart contract may be deployed to a blockchain address and can be accessed through the blockchain address.

The data structure 500 for the request may include an indication as to whether modification is required. Further, the request may indicate what kind of functionality the on-chain program needs to have generated or modified in order to adhere to a model. For example, as described herein, on-chain program verification system 160 may determine which tests an existing on-chain program has failed and determine which malicious activities can be associated with the one or more tests. These activities can be listed in the request. In the example of FIG. 5, the functionality that is needed to be modified is identified as "ownership_requirement," which may indicate that the on-chain program enabled a user without ownership to transfer assets, which must be fixed in order to adhere to a model, e.g., formal model. In some embodiments, the request may also optionally include the entire on-chain program, or a portion of the code, so that the system may modify the program or code accordingly. For example, the data structure 500 includes code 510.

The communication subsystem 122 may pass the request, or a pointer to the data in memory, to model determination subsystem 124. Before the system can generate or modify the code, the system may first determine which model the code must be modified or generated to adhere to. In some embodiments, the model determination subsystem 124 may identify the specific model the on-chain program is required to adhere to out of a plurality of models, such as from a list or repository. As described herein with respect to FIG. 8, each model may include a corresponding function group. The function group may include a set of components and relationships used to characterize a structure for at least one on-chain program.

In some embodiments, the system may determine which of the models to use by extracting a requirement identifier for the on-chain program from the request. In some examples, the requirement identifier may identify the requirements the on-chain program should adhere to. For example, FIG. 5 includes "requirement" of "UCC 12 standard," indicating that the on-chain program must adhere to the UCC 12 guidelines. Although the example of FIG. 5 only identifies one requirement, a user may wish for the on-chain program to adhere to more than one different model and, as such, may include a list of requirement identifiers as opposed to a single requirement identifier.

Figure 6:
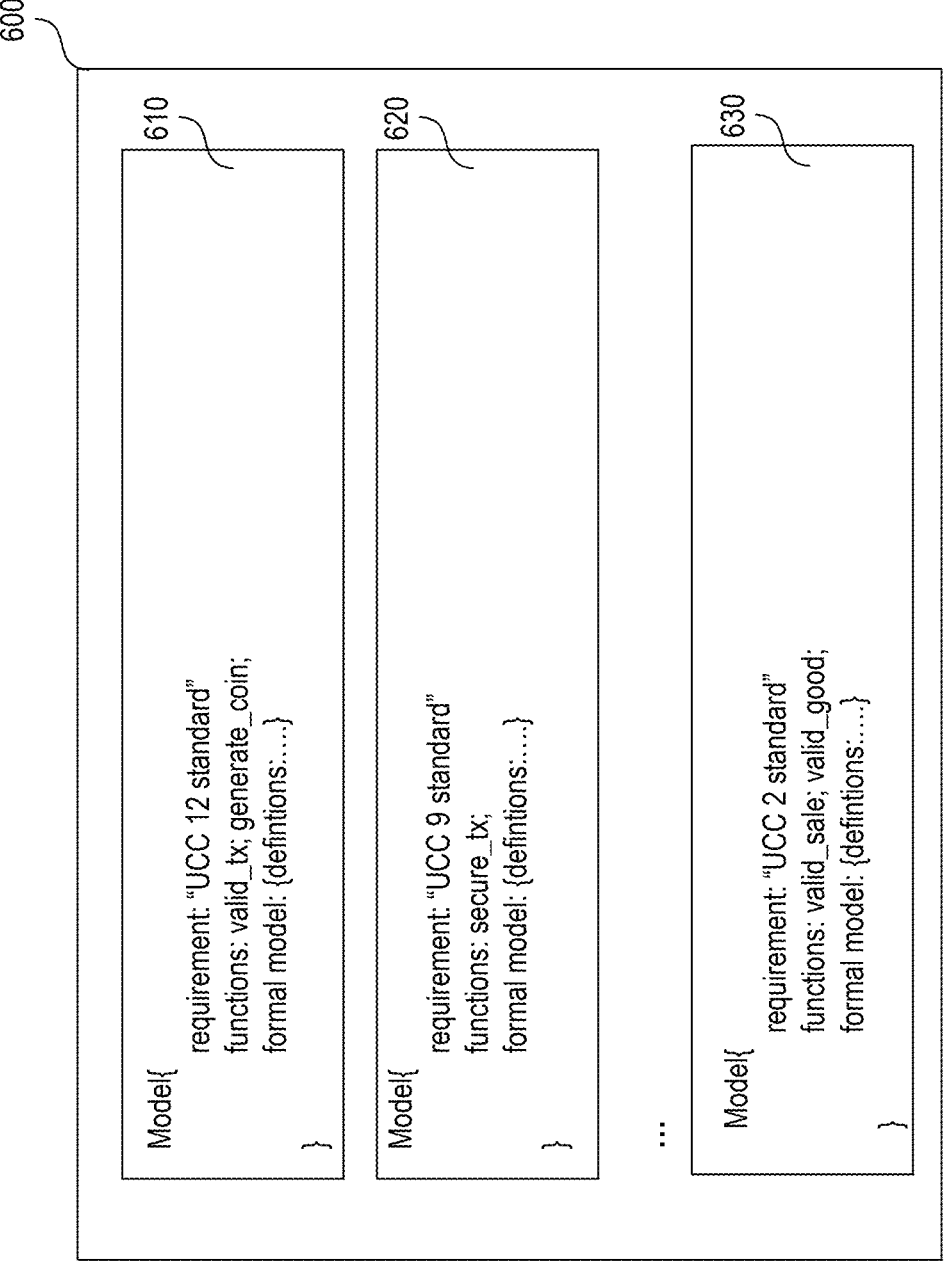
FIG. 6 illustrates a data structure comprising a plurality of models, in accordance with one or more embodiments of this disclosure.

The model determination subsystem 124 may compare the requirement identifier(s) with a plurality of requirement identifiers and determine the model(s) required for the on-chain program based on the requirement identifier matching an identifier(s) of the plurality of requirement identifiers. For example, FIG. 6 illustrates a data structure 600 comprising a plurality of models, in accordance with one or more embodiments of this disclosure. Data structure 600 may be stored remotely on repository 180 and accessed via communication subsystem 122. Alternatively, or additionally, the data structure 600 may be stored locally on memory.

FIG. 6 includes a plurality of models including model 610, model 620, and model 630. In the example of FIG. 6, model 610 may include an identifier such as "Requirement" identifying what standard the model adheres to. For example, model 610 adheres to "UCC 12 standard." The model 610 may also list functions such as "valid_tx" that represent a valid operation in accordance with the standard when executed. Similarly, model 620 may be a formal model that represents how an on-chain program in accordance with UCC-9 may perform when performing correctly. UCC-9 relates to secured transactions, and, as such, the functions may include operations for performing secure transactions in accordance with UCC-9. Similarly, model 630 is a formal model representing how an on-chain program in accordance with UCC-2 may perform when performing correctly. UCC-2 relates to sale of goods, and functions may include operations for creation of valid goods and transaction of valid goods in accordance with UCC-2. The models may also include the contents of formal models as described herein, e.g., formal model 800. For example, the models may be formal models that may include definitions, relationships, and functions or operations such as in set notation, logical representation, programmatic code, or the like.

As described herein, the model determination subsystem 124 may use identifier "UCC 12 standard" from the request to identify the model 610 from the models of data structure 600. The model determination subsystem 124 may pass the model identifier "UCC 12 standard", or a pointer to the data in memory, to the function retrieval subsystem 126. Function retrieval subsystem 126 may be configured to retrieve a plurality of functions associated with the formal model. The functions may provide required functionality for the on-chain program. In the example of FIG. 4-6, the functions may include, for example, "valid_tx." According to some examples, the function retrieval subsystem 126 may retrieve the functions from the formal model itself. However, alternatively, or additionally, the functions may be stored in a repository of functions, and each function may belong to more than one model. For example, while "valid_tx" is a function associated with model 610, it may also be used for a different model. Thus, in some examples, the functions may be stored on a repository and may each have associated metadata, such as tags, that identifies the models that they are associated with. Thus, the retrieval of the functions may include a search query comprising the keyword search of the model identifier and functions that include a tag with the model identifier may be retrieved. In some examples, retrieving the functions associated with the model may include retrieving, from a data structure associated with the model, a list of functions required by the model. The list of functions may include a plurality of function identifiers. The function retrieval subsystem may then extract from the list of functions the plurality of function identifiers associated with the plurality of functions.

The function retrieval subsystem 126 may then pass the functions, the function identifiers, or a pointer to the data in memory to the blockchain operation determination subsystem 128. Blockchain operation determination subsystem 128 may determine, based on the plurality of functions, a corresponding plurality of blockchain operations to be added to the on-chain program. In some embodiments, each blockchain operation of the plurality of blockchain operations may correspond to a function of the plurality of functions.

According to some embodiments, determining the plurality of blockchain operations to be added to the on-chain program comprises transmitting, to a blockchain operation database, an operation request for the plurality of blockchain operations, wherein the operation request comprises the plurality of function identifiers and receiving, from the blockchain operation database, a plurality of code portions corresponding to the plurality of blockchain operations. For example, as described in relation with functions, the blockchain operations may be stored on a local or remote database. Each blockchain operation may include metadata that indicates which functions the blockchain operation corresponds to. The operation request may include a function identifier in the search query, and in return, the database may identify code for a blockchain operation that includes the function identifier in the metadata.

For example, in the case that a function to be added was the functionality of a valid transaction "valid_tx" that would enable the on-chain program to perform valid transactions that adhere to the requirements of UCC-12 (e.g., to have ownership and control of an asset to be able to transfer the asset), the blockchain operation determination subsystem 128 would identify a corresponding blockchain operation such as a blockchain operation to require a transferrer to be an owner of the asset. For example, the system may transmit a request for a blockchain operation corresponding to "valid_tx" to a repository of blockchain operations, such as to repository 180. The system may receive, via communication subsystem 122, one or more blockchain operations to add into the on-chain program to provide the functionality needed to adhere to the model.

Figure 7:
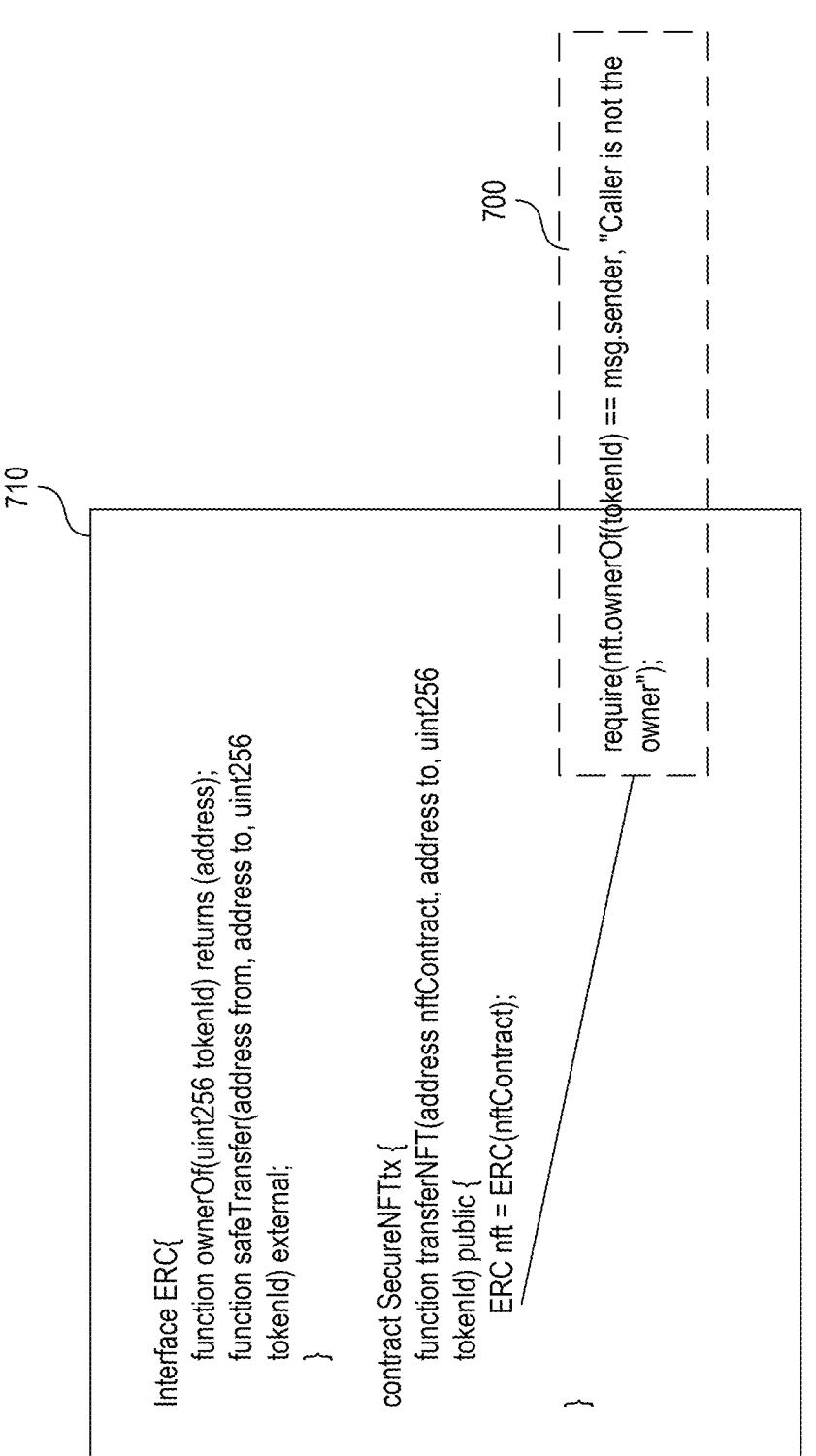
FIG. 7 illustrates a representation of an addition of generated on-chain program code to an on-chain program, in accordance with one or more embodiments of this disclosure.

For example, FIG. 7 shows an incomplete on-chain program 710 that lacks the functionality of "valid_tx", thereby making on-chain program 710 in violation of a guideline or model. Blockchain operation 700 "require (nft.ownerOf (tokenId)==msg.sender, "Caller is not the owner");" requires that a sender is the owner of the token and fails the transaction if the owner is not. The blockchain operation determination subsystem 128 may then pass the operations, or a pointer to the data in memory, to blockchain parameter determination subsystem 130. Blockchain parameter determination subsystem 130 may be configured to determine, based on the indication of the blockchain, a plurality of blockchain parameters for the plurality of blockchain operations. For example, determining the plurality of blockchain parameters for the plurality of blockchain operations may include extracting, from the request, the indication of the blockchain and transmitting to a blockchain node associated with the blockchain a blockchain request for the plurality of blockchain parameters. In return, the communication subsystem 122 may receive, from the blockchain node, the plurality of blockchain parameters.

The blockchain parameters and operations, or pointers to the data in memory, may be passed to the on-chain program generation subsystem 132. On-chain program generation subsystem 132 may generate, based on the plurality of blockchain operations and the plurality of blockchain parameters, the on-chain program code for the on-chain program. In the example of FIG. 7, the parameters may include variables such as msg.sender, msg.value, etc., which may be inserted into the blockchain operation, such as in blockchain operation 700.

According to some embodiments, the system may then add the generated code into the on-chain program. As described herein, the on-chain program may be provided as part of the request. Alternatively, or additionally, the system may retrieve the on-chain program, e.g., using the on-chain program identifier. The system may receive the on-chain program, wherein the on-chain program is incomplete, and add the on-chain program code to the on-chain program. In some examples, the system may compare the on-chain program code with current program code within the on-chain program. Based on comparing the on-chain program code with the current program code, the system may determine that a portion of the on-chain program code conflicts with the current program code. Based on determining that the portion of the on-chain program code conflicts with the current program code, the system may generate a notification indicating that the on-chain program includes malicious code and transmit the notification, such as to an operator or entity, e.g., at device 150.

Figure 9:
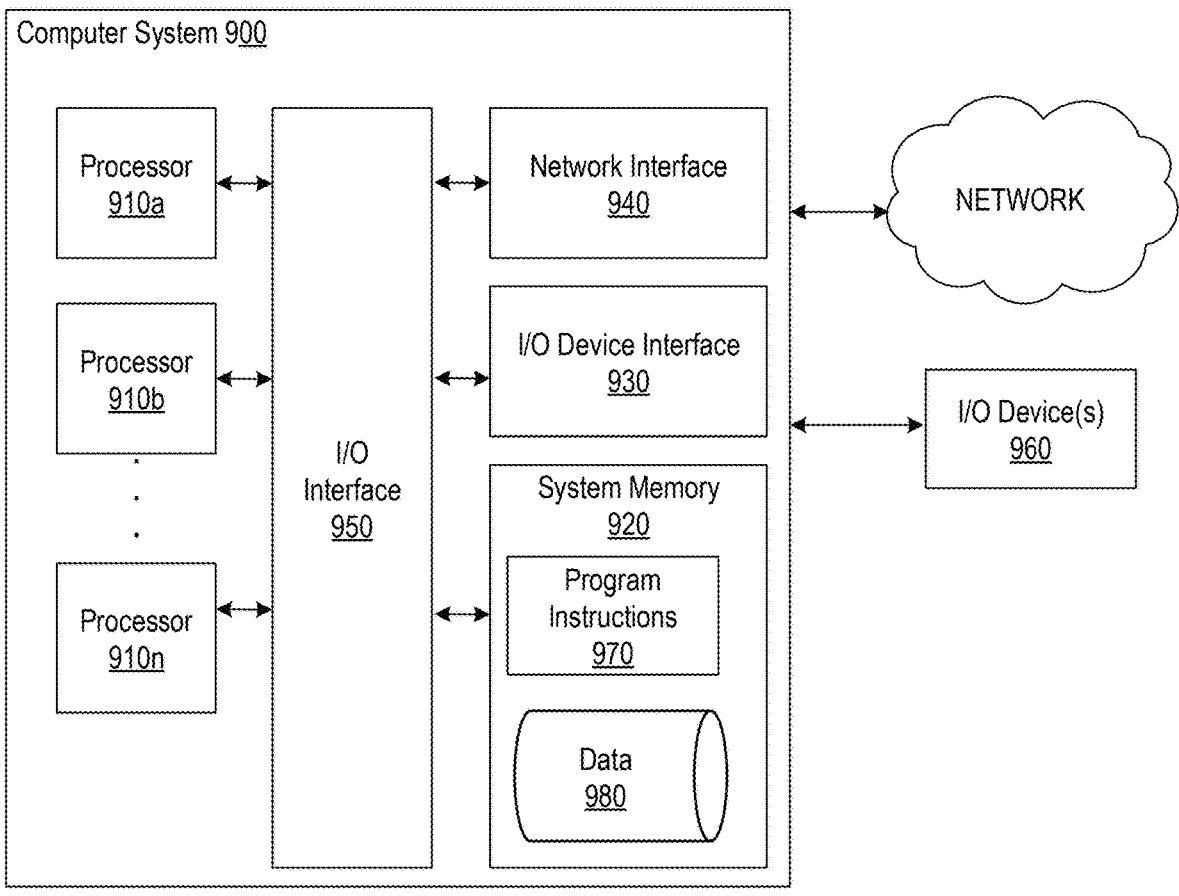
FIG. 9 illustrates a computing system that can be used for generating or testing on-chain program code, in accordance with one or more embodiments of this disclosure.

FIG. 9 shows an example computing system that may be used in accordance with some embodiments of this disclosure. In some instances, computing system 900 is referred to as a computer system 900. A person skilled in the art would understand that those terms may be used interchangeably. The components of FIG. 9 may be used to perform some or all operations discussed in relation to FIGS. 1-8. Furthermore, various portions of the systems and methods described herein may include or be executed on one or more computer systems similar to computing system 900. Further, processes and modules described herein may be executed by one or more processing systems similar to that of computing system 900.

Computing system 900 may include one or more processors (e.g., processors 910*a*-910*n*) coupled to system memory 920, an input/output (I/O) device interface 930, and a network interface 940 via an I/O interface 950. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 900. A processor may execute code (e.g., processor firmware, a protocol stack, a database management system, an operating system, or a combination thereof) that creates an execution environment for program instructions.

A processor may include a programmable processor. A processor may include general or special-purpose microprocessors. A processor may receive instructions and data from a memory (e.g., system memory 920). Computing system 900 may be a uni-processor system including one processor (e.g., processor 910*a*) or a multiprocessor system including any number of suitable processors (e.g., 910*a*-910*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special-purpose logic circuitry, e.g., an FPGA (field-programmable gate array) or an ASIC (application-specific integrated circuit). Computing system 900 may include a plurality of computing devices (e.g., distributed computer systems) to implement various processing functions.

I/O device interface 930 may provide an interface for connection of one or more I/O devices 960 to computer system 900. I/O devices may include devices that receive input (e.g., from a user) or output information (e.g., to a user). I/O devices 960 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 960 may be connected to computer system 900 through a wired or wireless connection. I/O devices 960 may be connected to computer system 900 from a remote location. I/O devices

960 located on remote computer systems, for example, may be connected to computer system 900 via a network and network interface 940.

The I/O device interface 930 and I/O devices 960 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, and/or the like. Alternatively, or additionally, the user may use their voice to indicate specific nodes, specific models, and/or the like via the voice recognition device and/or microphones.

Network interface 940 may include a network adapter that provides for connection of computer system 900 to a network. Network interface 940 may facilitate data exchange between computer system 900 and other devices connected to the network. Network interface 940 may support wired or wireless communication. The network may include an electronic communication network, such as the internet, a LAN, a WAN, a cellular communications network, or the like.

System memory 920 may be configured to store program instructions 970 or data 980. Program instructions 970 may be executable by a processor (e.g., one or more of processors 910*a*-910*n*) to implement one or more embodiments of the present techniques. Program instructions 970 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 920 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 920 may include a non-transitory, computer-readable storage medium that may have program instructions stored thereon that are executable by a computer processor (e.g., one or more of processors 910*a*-910*n*) to cause the subject matter and the functional operations described herein. A memory (e.g., system memory 920) may include a single memory device and/or a plurality of memory devices (e.g., distributed memory devices).

I/O interface 950 may be configured to coordinate I/O traffic between processors 910a-910n, system memory 920, network interface 940, I/O devices 960, and/or other peripheral devices. I/O interface 950 may perform protocol, timing, or other data transformations to convert data signals from one component (e.g., system memory 920) into a format suitable for use by another component (e.g., processors 910a-910n). I/O interface 950 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 900 or multiple computer systems 900 configured to host different portions or instances of embodiments. Multiple computer systems 900 may provide for parallel or sequential processing/execution of one or more portions of the techniques described herein.

Those skilled in the art will appreciate that computer system 900 is merely illustrative and is not intended to limit the scope of the techniques described herein. Computer system 900 may include any combination of devices or software that may perform or otherwise provide for the performance of the techniques described herein. For example, computer system 900 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 900 may also be connected to other devices that are not illustrated or may operate as a stand-alone system. In addition, the functionality provided by the illustrated components may, in some embodiments, be combined in fewer components or be distributed in additional components. Similarly, in some embodiments, the functionality of some of the illustrated components may not be provided, or other additional functionality may be available.

FIG. 10A is a flowchart 1000A of operations for testing an on-chain program, in accordance with one or more embodiments of this disclosure. The operations of FIG. 10A and FIG. 10B may use components described in relation to FIG. 9. In some embodiments, on-chain program verification system 160 may include one or more components of computer system 900. At operation 1002, one or more of processors 910a-910n may be used to install an on-chain program designated for testing onto a test blockchain. For example, installation herein can include causing installation, e.g., through transmission of a command to do so. One or more of processors 910a-910n may transmit such commands over communication network 140 using network interface 940.

At operation 1004, one or more of processors 910a-910n may further retrieve a plurality of functions associated with a model generated for testing on-chain programs. At operation 1006, one or more of processors 910a-910n may generate a plurality of blockchain operations for testing the on-chain program. At operation 1008, one or more of processors 910a-910n may input each blockchain operation into a cryptography-based storage application, e.g., such as a digital wallet, configured to execute blockchain operations. At operation 1010, one or more of processors 910a-910n may instruct the cryptography-based storage application to execute the plurality of blockchain operations against the test blockchain. At operation 1012, one or more of processors 910a-910n may receive a plurality of results based on execution of the plurality of blockchain operations. For example, communication subsystem 162 may be used to obtain the results, such as from a data node. At operation 1014, one or more of processors 910a-910n may, based on determining that a number of results that have failed exceed a predetermined threshold number, generate a notification indicating that the on-chain program has failed one or more tests.

FIG. 10B is a flowchart 1000B of operations for generating on-chain program code, in accordance with one or more embodiments of this disclosure. The operations of FIG. 10B may use components described in relation to FIG. 9. In some embodiments, on-chain program generation system 120 may include one or more components of computer system 900.

At operation 1022, one or more of processors 910a-910n receive a request to generate on-chain program code for an on-chain program, wherein the request comprises an indication of a blockchain where the on-chain program is to be installed. One or more of processors 910a-910n may receive the request over communication network 140 using network interface 940.

At operation 1024, one or more of processors 910a-910n may further determine a model required for the on-chain program, wherein the model is one of a plurality of models. According to some examples, the model may be a formal model as described herein. Alternatively, or additionally, each model may include a corresponding function group.

At operation 1026, one or more of processors 910a-910n may retrieve a plurality of functions associated with the model, wherein the plurality of functions provides required functionality for the on-chain program. At operation 1028, one or more of processors 910a-910n may determine, based on the plurality of functions, a plurality of blockchain operations to be added to the on-chain program.

At operation 1030, one or more of processors 910a-910n may determine, based on the indication of the blockchain, a plurality of blockchain parameters for the plurality of blockchain operations. At operation 1032, one or more of processors 910a-910n may generate, based on the plurality of blockchain operations and the plurality of blockchain parameters, the on-chain program code for the on-chain program. The on-chain program code may then be incorporated into the on-chain program as described herein.

Figure 11:
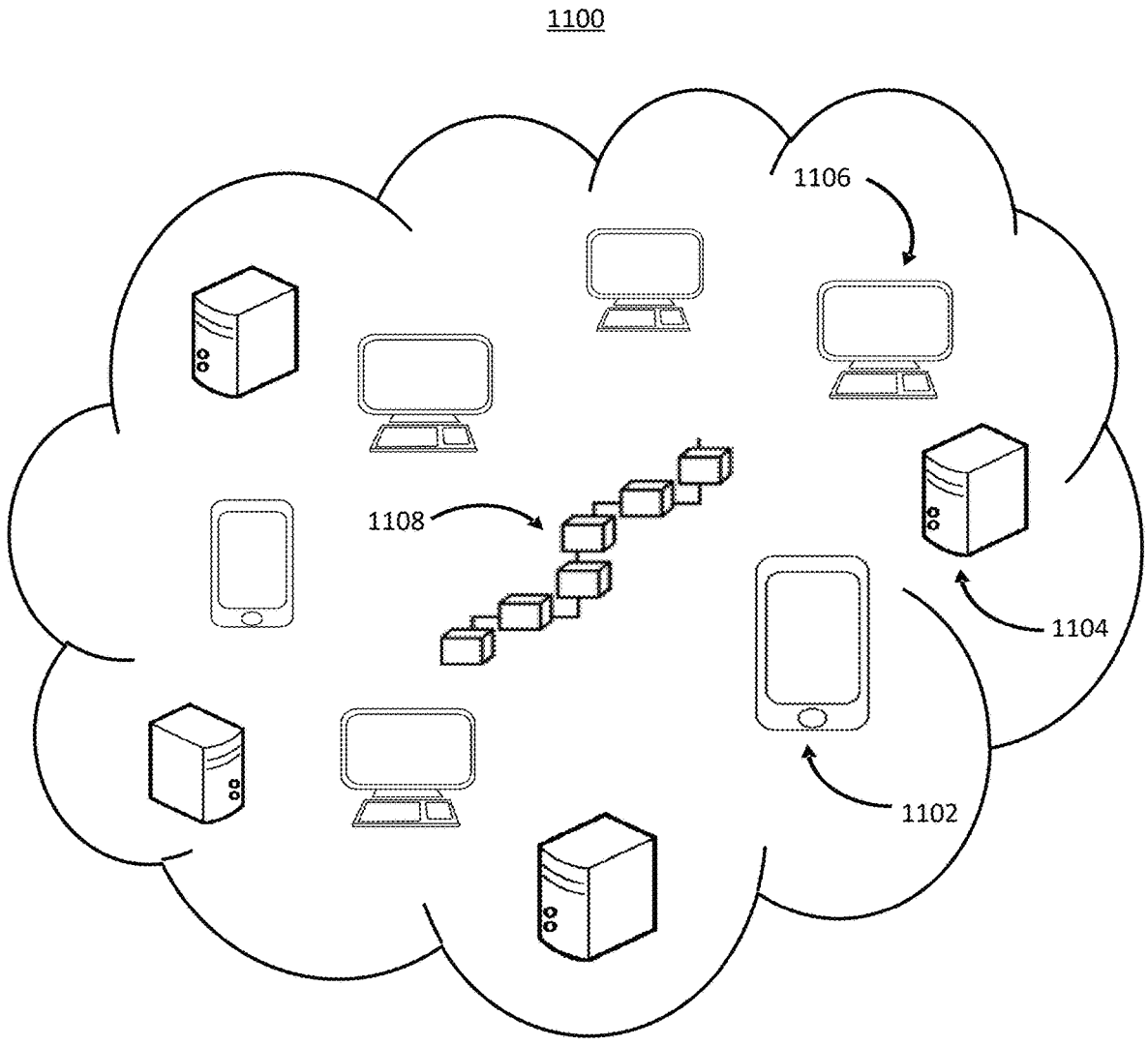
FIG. 11 shows an illustrative diagram for a decentralized environment for performing blockchain functions (sometimes referred to as blockchain operations), in accordance with one or more embodiments.

FIG. 11 shows an illustrative diagram for a decentralized environment for performing blockchain functions (sometimes referred to as blockchain operations), in accordance with one or more embodiments. For example, the diagram presents various components that may be used for transferring control of vehicle information to other users using NFTs in some embodiments.

As shown in FIG. 11, system 1100 may include multiple user devices (e.g., user device 1102, user device 1104, and/or user device 1106). For example, system 1100 may comprise a distributed state machine in which each of the components in FIG. 11 acts as a client of system 1100. For example, system 1100 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 1100 may interact with, and facilitate the function of, blockchain 1108.

It should be noted that while shown as a smartphone, a personal computer, and a server in FIG. 11, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing the system 1100 performing a blockchain function may equally be applied to, and correspond to, an individual user device (e.g., user device 1102, user device 1104, and/or user device 1106) performing the blockchain function. That is, system 1100 may correspond to the user devices (e.g., user device 1102, user device 1104, and/or user device 1106) collectively or individually.

Each of the user devices may be used by the system to conduct blockchain functions. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related NFTs, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including an NFT. An NFT may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 11, one or more user devices may include a digital wallet (e.g., digital wallet associated with user device 1104) used to perform blockchain functions. A digital wallet may be referred to as a cryptography-based storage application. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets, such as hot wallets and cold wallets. Hot wallets are connected to the Internet, while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 11, one or more user devices may include a private key and/or digital signature. Digital signature may sometimes be referred to as cryptographic signature. For example, system 1100 may use cryptographic systems for conducting blockchain functions, such as for transferring control of vehicle information to other users using NFTs. For example, system 1100 may use public key cryptography, which features a pair of digital keys (e.g., which may comprise strings of data). In such cases, each pair comprises a public key (e.g., which may be public) and a private key (e.g., which may be kept private). System 1100 may generate the key pairs using cryptographic algorithms (e.g., featuring one-way functions). System 1100 may then encrypt a message (or other blockchain function) using an intended receiver's public key such that the encrypted message may be decrypted only with the receiver's corresponding private key. In some embodiments, system 1100 may combine a message with a private key to create a digital signature on the message. For example, the digital signature may be used to verify the authenticity of blockchain functions. As an illustration, when conducting blockchain functions, system 1100 may use the digital signature to prove to every node in the system that it is authorized to conduct the blockchain functions.

For example, system 1100 may comprise a plurality of nodes for the blockchain network. Each node may correspond to a user device (e.g., user device 1102). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 1102 may request a blockchain function (e.g., conduct a transaction). The blockchain function may be authenticated by user device 1104 and/or another node (e.g., a user device in the community network of system 1100). For example, using cryptographic keys, system 1100 may identify users and give access to their respective user accounts (e.g., corresponding digital wallets) within system 1100. Using private keys (e.g., known only to the respective users) and public keys (e.g., known to the community network), system 1100 may create digital signatures to authenticate the users.

Following an authentication of the blockchain function, the blockchain function may be authorized. For example, after the blockchain function is authenticated between the users, system 1100 may authorize the blockchain function prior to adding it to the blockchain. System 1100 may add the blockchain function to blockchain 1108. System 1100 may perform this based on a consensus of the user devices within system 1100. For example, system 1100 may rely on a majority (or other metric) of the nodes in the community network (e.g., user device 1102, user device 1104, and/or user device 1106) to determine that the blockchain function is valid. In response to validation of the block, a node user device (e.g., user device 1102, user device 1104, and/or user device 1106) in the community network (e.g., a miner) may receive a reward (e.g., in a given cryptocurrency) as an incentive for validating the block.

To validate the blockchain function, system 1100 may use one or more validation protocols and/or validation (or consensus) mechanisms. For example, system 1100 may use a Proof of Work ("POW") mechanism in which a user device must provide evidence that it performed computational work to validate a blockchain function, and thus, this mechanism provides a manner for achieving consensus in a decentralized manner, as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively, or additionally, system 1100 may use a Proof of Stake ("POS") mechanism in which a user account (e.g., corresponding to a node on the blockchain network) is required to have, or "stake," a predetermined amount of tokens in order for system 1100 to recognize it as a validator in the blockchain network.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method comprising: receiving a request to generate on-chain program code for an on-chain program, wherein the request comprises an indication of a blockchain where the on-chain program is to be installed; determining, based on the request, a formal model required for the on-chain program, wherein the formal model is one of a plurality of formal models and wherein each formal model comprises a corresponding function group including a set of rules and relationships used to characterize a structure for at least one on-chain program; retrieving a plurality of functions associated with the formal model, wherein the plurality of functions provides required functionality for the on-chain program; determining, based on the plurality of functions, a plurality of blockchain operations to be added to the on-chain program, wherein each blockchain operation of the plurality of blockchain operations corresponds to a function of the plurality of functions; determining, based on the indication of the blockchain, a plurality of blockchain parameters for the plurality of blockchain operations; and generating, based on the plurality of blockchain operations and the plurality of blockchain parameters, the on-chain program code for the on-chain program.

A2. A method comprising: receiving a request to generate on-chain program code for an on-chain program, wherein the request comprises an indication of a blockchain where the on-chain program is to be installed; determining, based on the request, a model required for the on-chain program, wherein the model is one of a plurality of models and wherein each model comprises a corresponding function group; retrieving a plurality of functions associated with the model, wherein the plurality of functions provides required functionality for the on-chain program; determining, based on the plurality of functions, a plurality of blockchain operations to be added to the on-chain program; determining, based on the indication of the blockchain, a plurality of blockchain parameters for the plurality of blockchain operations; and generating, based on the plurality of blockchain operations and the plurality of blockchain parameters, the on-chain program code for the on-chain program.

A3. The method of any of the preceding embodiments, wherein each blockchain operation of the plurality of blockchain operations corresponds to a function of the plurality of functions.

A4. The method of any of the preceding embodiments, wherein determining the model required for the on-chain program further comprises: extracting from the request a requirement identifier for the on-chain program; comparing the requirement identifier with a plurality of requirement identifiers associated with the plurality of models; and determining the model required for the on-chain program based on the requirement identifier matching an identifier of the plurality of requirement identifiers.

A5. The method of any of the preceding embodiments, wherein retrieving the plurality of functions associated with the model further comprises: retrieving, from a data structure associated with the model, a list of functions required by the model, wherein the list of functions comprises a plurality of function identifiers; and extracting from the list of functions the plurality of function identifiers associated with the plurality of functions.

A6. The method of any of the preceding embodiments, wherein determining the plurality of blockchain operations to be added to the on-chain program further comprises: transmitting, to a blockchain operation database, an operation request for the plurality of blockchain operations, wherein the operation request comprises the plurality of function identifiers; and receiving, from the blockchain operation database, a plurality of code portions corresponding to the plurality of blockchain operations.

A7. The method of any of the preceding embodiments, wherein determining the plurality of blockchain parameters for the plurality of blockchain operations further comprises: extracting, from the request, the indication of the blockchain; transmitting, to a blockchain node associated with the blockchain, a blockchain request for the plurality of blockchain parameters; and receiving, from the blockchain node, the plurality of blockchain parameters.

A8. The method of any of the preceding embodiments, further comprising: receiving the on-chain program, wherein the on-chain program is incomplete; and adding the on-chain program code to the on-chain program.

A9. The method of any of the preceding embodiments, further comprising: comparing the on-chain program code with current program code within the on-chain program; determining, based on comparing the on-chain program code with the current program code, that a portion of the on-chain program code conflicts with the current program code; and based on determining that the portion of the on-chain program code conflicts with the current program code, generating a notification indicating that the on-chain program includes malicious code.

A10. One or more tangible, non-transitory, computer-readable media storing instructions that, when executed by a data processing apparatus, cause the data processing apparatus to perform operations comprising those of any of embodiments A1-9.

A11. A system comprising: one or more processors; and memory storing instructions that, when executed by the one or more processors, cause the processors to effectuate operations comprising those of any of embodiments A1-9.

A12. A system comprising means for performing any of embodiments A1-9.

A13. A system comprising cloud-based circuitry for performing any of embodiments A1-9.

B1. A method comprising: receiving, from a public blockchain node of a public blockchain, an on-chain program designated for testing; transmitting a command to a test blockchain node to install the on-chain program onto a test blockchain; retrieving a plurality of functions associated with a formal model generated for testing on-chain programs, wherein the formal model comprises a set of rules and relationships used to characterize a structure for at least one on-chain program; generating, based on each function of the plurality of functions, a plurality of blockchain operations for testing the on-chain program; inputting each blockchain operation of the plurality of blockchain operations into a cryptography-based storage application, wherein the cryptography-based storage application is configured to execute blockchain operations against the test blockchain using the test blockchain node; instructing the cryptography-based storage application to execute the plurality of blockchain operations against the test blockchain; receiving, from the test blockchain node via the cryptography-based storage application, a plurality of results based on execution of the plurality of blockchain operations; comparing each result of the plurality of results with each corresponding expected result associated with a corresponding function of the plurality of functions; and based on determining that one or more results of the plurality of results do not match a corresponding expected result associated with the corresponding function of the plurality of functions, generating a notification indicating that the on-chain program has failed one or more tests.

B2. A method comprising: receiving from a public blockchain node of a public blockchain, an on-chain program designated for testing; installing an on-chain program designated for testing onto a test blockchain; retrieving a plurality of functions associated with a model generated for testing on-chain programs; generating, based on each function of the plurality of functions, a plurality of blockchain operations for testing the on-chain program; inputting each blockchain operation of the plurality of blockchain operations into a cryptography-based storage application, wherein the cryptography-based storage application is configured to execute blockchain operations against the test blockchain using a test blockchain node; instructing the cryptography-based storage application to execute the plurality of blockchain operations against the test blockchain; receiving, from the test blockchain node via the cryptography-based storage application, a plurality of results based on execution of the plurality of blockchain operations; and based on determining that a number of results that have failed exceed a predetermined threshold number, generating a notification indicating that the on-chain program has failed one or more tests.

B3. The method of any of the preceding embodiments, further comprising: receiving, the on-chain program designated for testing from a public blockchain node of a public blockchain; retrieving a list of required functions that comprises required functions for one or more on-chain programs; retrieving, based on the list of required functions, corresponding blockchain code associated with the required functions; and generating, using each corresponding blockchain code, the model for testing the on-chain programs.

B4. The method of any of the preceding embodiments, wherein retrieving the list of required functions further comprises: receiving an indication of a function group, wherein the function group comprises requirements for the on-chain program; and determining, based on the function group, the list of required functions.

B5. The method of any of the preceding embodiments, wherein generating the plurality of blockchain operations for testing the on-chain program further comprises: selecting a first function of the plurality of functions; determining a first blockchain operation of the plurality of blockchain operations corresponding to the first function of the plurality of functions; retrieving first blockchain code corresponding to the first blockchain operation; updating the first blockchain code with code parameters for executing on the test blockchain; and adding the first blockchain code to the plurality of blockchain operations.

B6. The method of any of the preceding embodiments, wherein receiving the plurality of results based on the execution of the plurality of blockchain operations further comprises: receiving, from the test blockchain node, a plurality of hashes corresponding to the plurality of blockchain operations; retrieving, from the test blockchain node using the plurality of hashes, blockchain operation data associated with each blockchain operation of the plurality of blockchain operations, wherein each hash of the plurality of hashes is used by the test blockchain node to retrieve blockchain data associated with a corresponding hash; and storing the blockchain operation data in a data structure.

B7. The method of any of the preceding embodiments, wherein comparing each result of the plurality of results with each corresponding expected result associated with the corresponding function of the plurality of functions further comprises: selecting a first portion of the blockchain operation data corresponding to a first hash; selecting a first expected result of a plurality of expected results; comparing outputs of the first portion of the blockchain operation data with expected outputs from the first expected result; and generating a failure flag for the first portion of the blockchain operation data based on the outputs of the first portion of the blockchain operation data not matching the expected outputs.

B8. The method of any of the preceding embodiments, wherein generating the notification indicating that the on-chain program has failed the one or more tests further comprises: identifying the one or more tests that have failed; determining, based on the one or more tests, one or more malicious activities associated with the one or more tests, and adding to the notification the one or more malicious activities.

B9. The method of any of the preceding embodiments, further comprising: retrieving one or more blockchain code samples associated with the one or more tests that failed; and generating, based on the one or more blockchain code samples, one or more code portions to replace blockchain code that failed.

B10. One or more tangible, non-transitory, computer-readable media storing instructions that, when executed by a data processing apparatus, cause the data processing apparatus to perform operations comprising those of any of embodiments B1-9.

B11. A system comprising: one or more processors; and memory storing instructions that, when executed by the one or more processors, cause the processors to effectuate operations comprising those of any of embodiments B1-9.

B12. A system comprising means for performing any of embodiments B1-9.

B13. A system comprising cloud-based circuitry for performing any of embodiments B1-9.

What is claimed is:

1. A system for on-chain program code generation, the system comprising:

one or more processors; and one or more non-transitory, computer-readable storage media storing instructions, which, when executed by the one or more processors, cause the one or more processors to perform operations comprising:

receiving a request to generate on-chain program code for an on-chain program, wherein the request comprises an indication of a blockchain where the on-chain program is to be installed and a requirement identifier, wherein the requirement identifier comprises standardized guidelines for the on-chain program;

determining, based on the requirement identifier, a formal model corresponding to the requirement identifier, wherein the formal model is one of a plurality of formal models and wherein each formal model comprises a predetermined function group, wherein each predetermined function within the predetermined function group comprises a corresponding tag with a corresponding requirement identifier including a set of components and relationships used to characterize a structure for at least one on-chain program;

retrieving, based on each corresponding tag of each predetermined function within the predetermined function group, a plurality of functions associated with the formal model, wherein the plurality of functions provides required functionality for the on-chain program;

determining, based on the plurality of functions, a plurality of blockchain operations to be added to the on-chain program, wherein each blockchain operation of the plurality of blockchain operations corresponds to a function of the plurality of functions;

determining, based on the indication of the blockchain, a plurality of blockchain parameters for the plurality of blockchain operations;

generating, based on the plurality of blockchain operations and the plurality of blockchain parameters, the on-chain program code for the on-chain program;

adding the on-chain program code to the on-chain program; and transmitting a command to a blockchain node to commit the on-chain program to the blockchain, wherein the blockchain node in response to the command generates a new block within the blockchain, the new block comprising the on-chain program.

2. The system of claim 1, wherein the instructions for determining the formal model required for the on-chain program further cause the one or more processors to perform operations comprising:

extracting, from the request, the requirement identifier;

comparing the extracted requirement identifier with a plurality of requirement identifiers associated with the plurality of formal models; and determining the formal model required for the on-chain program based on the extracted requirement identifier matching an identifier of the plurality of requirement identifiers.

3. The system of claim 1, wherein the instructions for retrieving the plurality of functions associated with the formal model further cause the one or more processors to perform operations comprising:

retrieving, from a data structure associated with the formal model, a list of functions required by the formal model, wherein the list of functions comprises a plurality of function identifiers; and extracting from the list of functions the plurality of function identifiers associated with the plurality of functions.

4. The system of claim 3, wherein the instructions for determining the plurality of blockchain operations to be added to the on-chain program further cause the one or more processors to perform operations comprising:

transmitting, to a blockchain operation database, an operation request for the plurality of blockchain operations, wherein the operation request comprises the plurality of function identifiers; and receiving, from the blockchain operation database, a plurality of code portions corresponding to the plurality of blockchain operations.

5. The system of claim 1, wherein the instructions for determining the plurality of blockchain parameters for the plurality of blockchain operations further cause the one or more processors to perform operations comprising:

extracting, from the request, the indication of the blockchain;

transmitting, to the blockchain node associated with the blockchain, a blockchain request for the plurality of blockchain parameters; and receiving, from the blockchain node, the plurality of blockchain parameters.

6. The system of claim 1, wherein the instructions further cause the one or more processors to perform operations comprising:

comparing the on-chain program code with current program code within the on-chain program;

determining, based on comparing the on-chain program code with the current program code, that a portion of the on-chain program code conflicts with the current program code; and based on determining that the portion of the on-chain program code conflicts with the current program code, generating a notification indicating that the on-chain program includes malicious code.

7. A method for on-chain program code generation, the method comprising:

receiving a request to generate on-chain program code for an on-chain program, wherein the request comprises an indication of a blockchain where the on-chain program is to be installed and a requirement identifier, wherein the requirement identifier comprises standardized guidelines for the on-chain program;

determining, based on the requirement identifier, a model corresponding to the requirement identifier, wherein the model is one of a plurality of models and wherein each model comprises a predetermined function group, wherein each predetermined function within the predetermined function group comprises a corresponding tag with a corresponding requirement identifier;

retrieving, based on each corresponding tag of each predetermined function within the predetermined function group, a plurality of functions associated with the model, wherein the plurality of functions provides required functionality for the on-chain program;

determining, based on the plurality of functions, a plurality of blockchain operations to be added to the on-chain program;

determining, based on the indication of the blockchain, a plurality of blockchain parameters for the plurality of blockchain operations;

generating, based on the plurality of blockchain operations and the plurality of blockchain parameters, the on-chain program code for the on-chain program;

adding the on-chain program code to the on-chain program; and transmitting a command to a blockchain node to commit the on-chain program to the blockchain, wherein the blockchain node in response to the command generates a new block within the blockchain, the new block comprising the on-chain program.

8. The method of claim 7, wherein each blockchain operation of the plurality of blockchain operations corresponds to a function of the plurality of functions.

9. The method of claim 7, wherein determining the model required for the on-chain program further comprises:

extracting, from the request, the requirement identifier;

comparing the extracted requirement identifier with a plurality of requirement identifiers associated with the plurality of models; and determining the model required for the on-chain program based on the extracted requirement identifier matching an identifier of the plurality of requirement identifiers.

10. The method of claim 7, wherein retrieving the plurality of functions associated with the model further comprises:

retrieving, from a data structure associated with the model, a list of functions required by the model, wherein the list of functions comprises a plurality of function identifiers; and extracting, from the list of functions, the plurality of function identifiers associated with the plurality of functions.

11. The method of claim 10, wherein determining the plurality of blockchain operations to be added to the on-chain program further comprises:

transmitting, to a blockchain operation database, an operation request for the plurality of blockchain operations, wherein the operation request comprises the plurality of function identifiers; and receiving, from the blockchain operation database, a plurality of code portions corresponding to the plurality of blockchain operations.

12. The method of claim 7, wherein determining the plurality of blockchain parameters for the plurality of blockchain operations further comprises:

extracting, from the request, the indication of the blockchain;

transmitting, to the blockchain node associated with the blockchain, a blockchain request for the plurality of blockchain parameters; and receiving, from the blockchain node, the plurality of blockchain parameters.

13. One or more non-transitory, computer-readable media comprising instructions recorded thereon that, when executed by one or more processors, cause operations comprising:

receiving a request to generate on-chain program code for an on-chain program, wherein the request comprises an indication of a blockchain where the on-chain program is to be installed and a requirement identifier, wherein the requirement identifier comprises standardized guidelines for the on-chain program;

determining, based on the requirement identifier, a model corresponding to the requirement identifier, wherein the model is one of a plurality of models and wherein each model comprises a predetermined function group, wherein each predetermined function within the predetermined function group comprises a corresponding tag with a corresponding requirement identifier;

retrieving, based on each corresponding tag of each predetermined function within the predetermined function group, a plurality of functions associated with the model, wherein the plurality of functions provides required functionality for the on-chain program;

determining, based on the plurality of functions, a plurality of blockchain operations to be added to the on-chain program;

determining, based on the indication of the blockchain, a plurality of blockchain parameters for the plurality of blockchain operations;

generating, based on the plurality of blockchain operations and the plurality of blockchain parameters, the on-chain program code for the on-chain program;

adding the on-chain program code to the on-chain program; and transmitting a command to a blockchain node to commit the on-chain program to the blockchain, wherein the blockchain node in response to the command generates a new block within the blockchain, the new block comprising the on-chain program.

14. The one or more non-transitory, computer-readable media of claim 13, wherein the instructions for determining the model required for the on-chain program further cause the one or more processors to perform operations comprising:

extracting, from the request, the requirement identifier;

comparing the extracted requirement identifier with a plurality of requirement identifiers associated with the plurality of models; and determining the model required for the on-chain program based on the extracted requirement identifier matching an identifier of the plurality of requirement identifiers.

15. The one or more non-transitory, computer-readable media of claim 13, wherein the instructions for retrieving the plurality of functions associated with the model further cause the one or more processors to perform operations comprising:

retrieving, from a data structure associated with the model, a list of functions required by the model, wherein the list of functions comprises a plurality of function identifiers; and extracting, from the list of functions, the plurality of function identifiers associated with the plurality of functions.

16. The one or more non-transitory, computer-readable media of claim 15, wherein the instructions for determining the plurality of blockchain operations to be added to the on-chain program further cause the one or more processors to perform operations comprising:

transmitting, to a blockchain operation database, an operation request for the plurality of blockchain operations, wherein the operation request comprises the plurality of function identifiers; and receiving, from the blockchain operation database, a plurality of code portions corresponding to the plurality of blockchain operations.

17. The one or more non-transitory, computer-readable media of claim 13, wherein the instructions for determining the plurality of blockchain parameters for the plurality of blockchain operations further cause the one or more processors to perform operations comprising:

extracting, from the request, the indication of the blockchain;

transmitting, to the blockchain node associated with the blockchain, a blockchain request for the plurality of blockchain parameters; and receiving, from the blockchain node, the plurality of blockchain parameters.

18. The one or more non-transitory, computer-readable media of claim 13, wherein the instructions further cause the one or more processors to perform operations comprising:

comparing the on-chain program code with current program code within the on-chain program;

determining, based on comparing the on-chain program code with the current program code, that a portion of the on-chain program code conflicts with the current program code; and based on determining that the portion of the on-chain program code conflicts with the current program code, generating a notification indicating that the on-chain program includes malicious code.

* * * * *